(12) United States Patent
Matsui

(10) Patent No.: US 7,052,138 B2
(45) Date of Patent: May 30, 2006

(54) DISPLAY APPARATUS, LIGHT SOURCE DEVICE, AND ILLUMINATION UNIT

(75) Inventor: Shinzo Matsui, Kitatsuru-gun (JP)

(73) Assignee: Olympus Corporation (JP)

( * ) Notice: Subject to any disclaimer, the term of this patent is extended or adjusted under 35 U.S.C. 154(b) by 59 days.

(21) Appl. No.: 10/729,528

(22) Filed: Dec. 5, 2003

(65) Prior Publication Data

US 2005/0073845 A1 Apr. 7, 2005

(30) Foreign Application Priority Data

Dec. 5, 2002 (JP) ............................ 2002-353902

(51) Int. Cl.
*G03B 21/00* (2006.01)
*G03B 21/14* (2006.01)
*G03B 21/26* (2006.01)
*H04N 5/64* (2006.01)
*H04N 9/31* (2006.01)

(52) U.S. Cl. ............................ 353/31; 353/69; 353/94; 348/744

(58) Field of Classification Search ............... 353/31, 353/34, 69, 94, 122; 349/5, 7, 8, 62; 345/102; 348/744

See application file for complete search history.

(56) References Cited

U.S. PATENT DOCUMENTS

| 6,069,676 | A | 5/2000 | Yuyama ..................... 349/62 |
|---|---|---|---|
| 6,129,437 | A | 10/2000 | Koga et al. .................. 353/98 |
| 6,227,669 | B1 | 5/2001 | Tiao et al. ................... 353/31 |
| 6,318,863 | B1 | 11/2001 | Tiao et al. ................... 353/31 |
| 6,411,047 | B1 | 6/2002 | Okazaki et al. ............. 315/312 |
| 6,719,428 | B1 * | 4/2004 | Noguchi ...................... 353/31 |
| 6,726,329 | B1 * | 4/2004 | Li et al. ...................... 353/20 |
| 6,762,743 | B1 * | 7/2004 | Yoshihara et al. .......... 345/102 |
| 6,869,190 | B1 * | 3/2005 | Ando et al. .................. 353/85 |

FOREIGN PATENT DOCUMENTS

| JP | 09098443 | 4/1997 |
|---|---|---|
| JP | 11032278 | 2/1999 |
| JP | 11295689 | 10/1999 |
| JP | 2000293133 | 10/2000 |
| JP | 2001343935 | 12/2001 |

* cited by examiner

Primary Examiner—Melissa Jan Koval
(74) Attorney, Agent, or Firm—Volpe and Koenig, P.C.

(57) ABSTRACT

A display apparatus capable of illuminating a light modulation device with a light from a light emitting body to display an image on a display plane comprises a plurality of light emitting bodies (R, G, B) different from one another in emitted light color, a light receiving device configured to detect the light from the light emitting bodies and to output an amount of light received, and a color balance adjustment control section configured to adjust and control a color balance in the display plane in accordance with the amount of light received by the light receiving device. The color balance adjustment control section is configured to be capable of identifying the emitted light color of the light emitting body relating to the amount of light received.

6 Claims, 25 Drawing Sheets

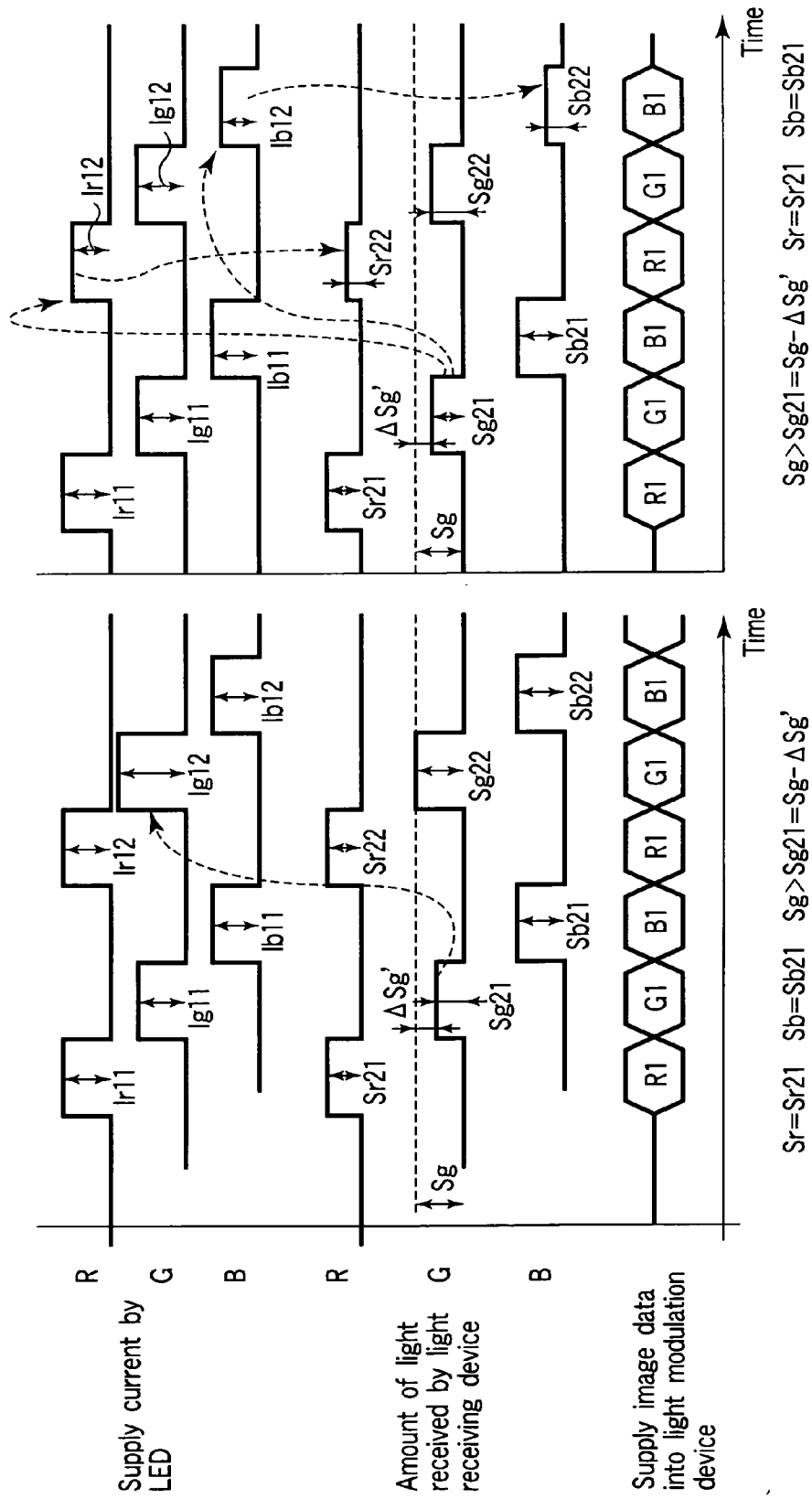

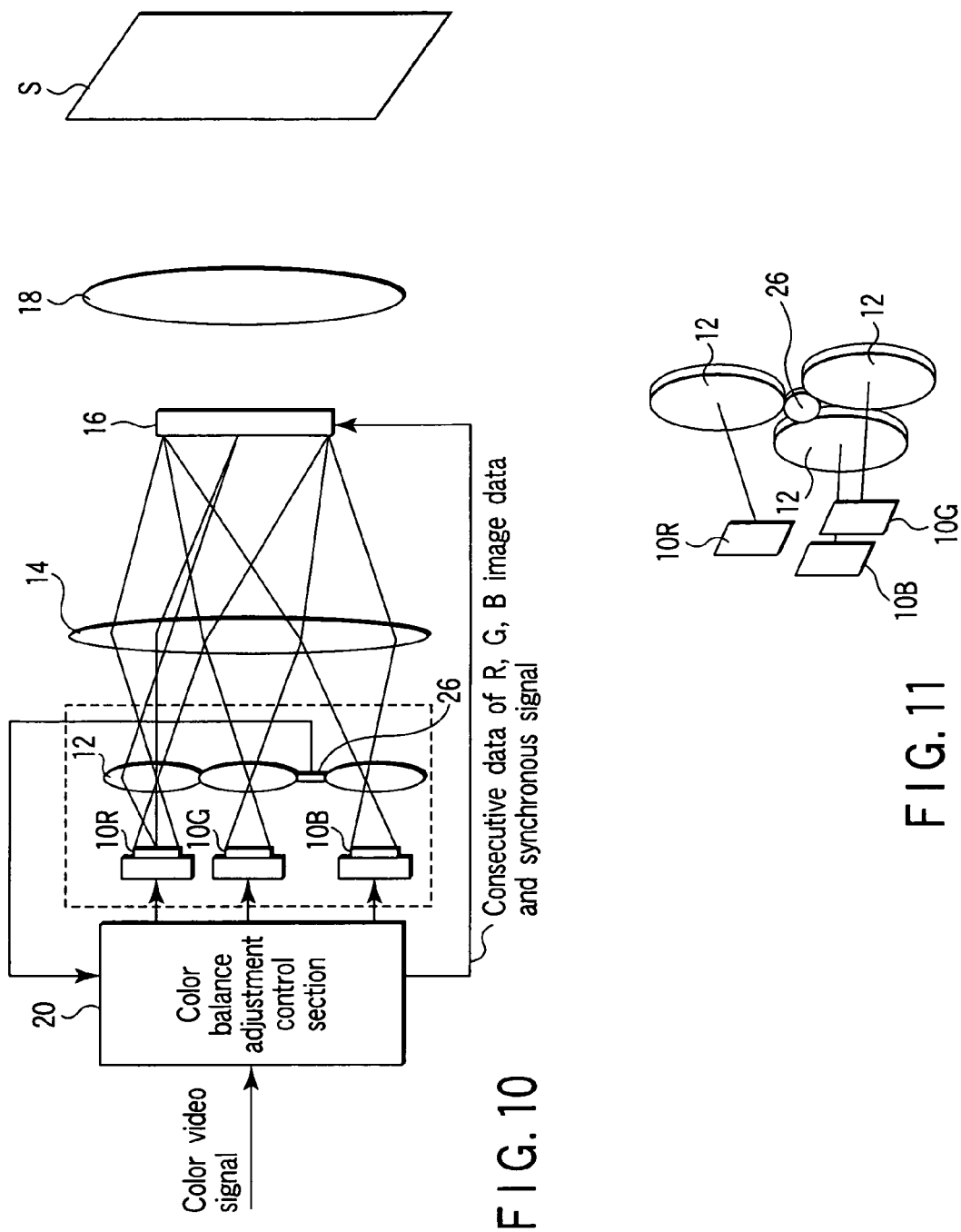

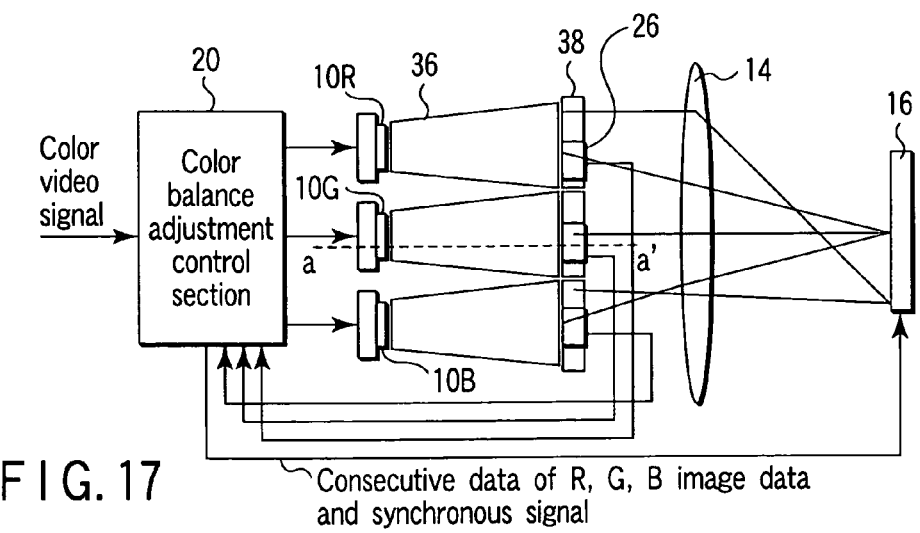
FIG. 17 Consecutive data of R, G, B image data and synchronous signal
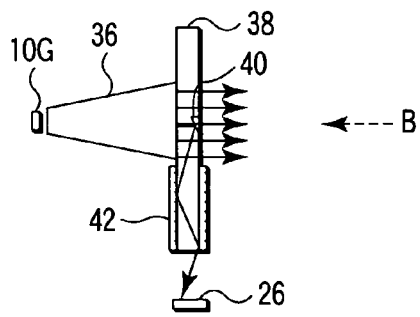
FIG. 18
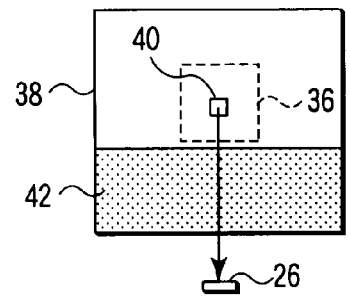
FIG. 19
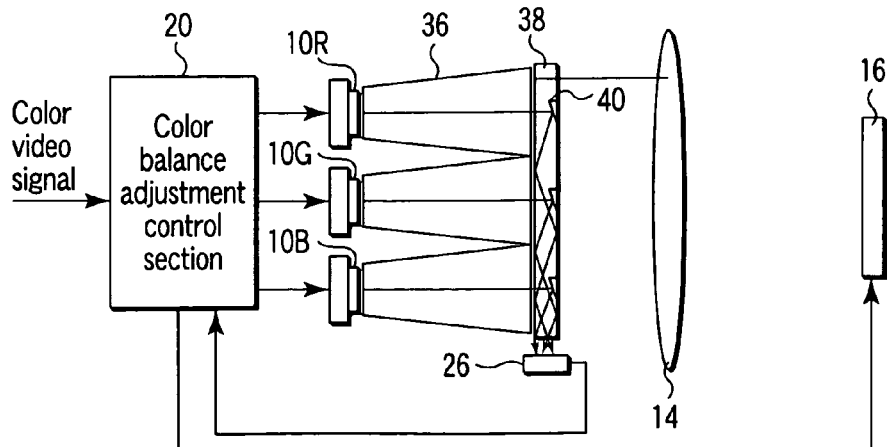
FIG. 20 Consecutive data of R, G, B image data and synchronous signal

| Rank | Tall + Δt |
|---|---|
| A | 5000 hours |
| B | 20000 hours |
| C | 50000 hours |
| D | 100000 hours |

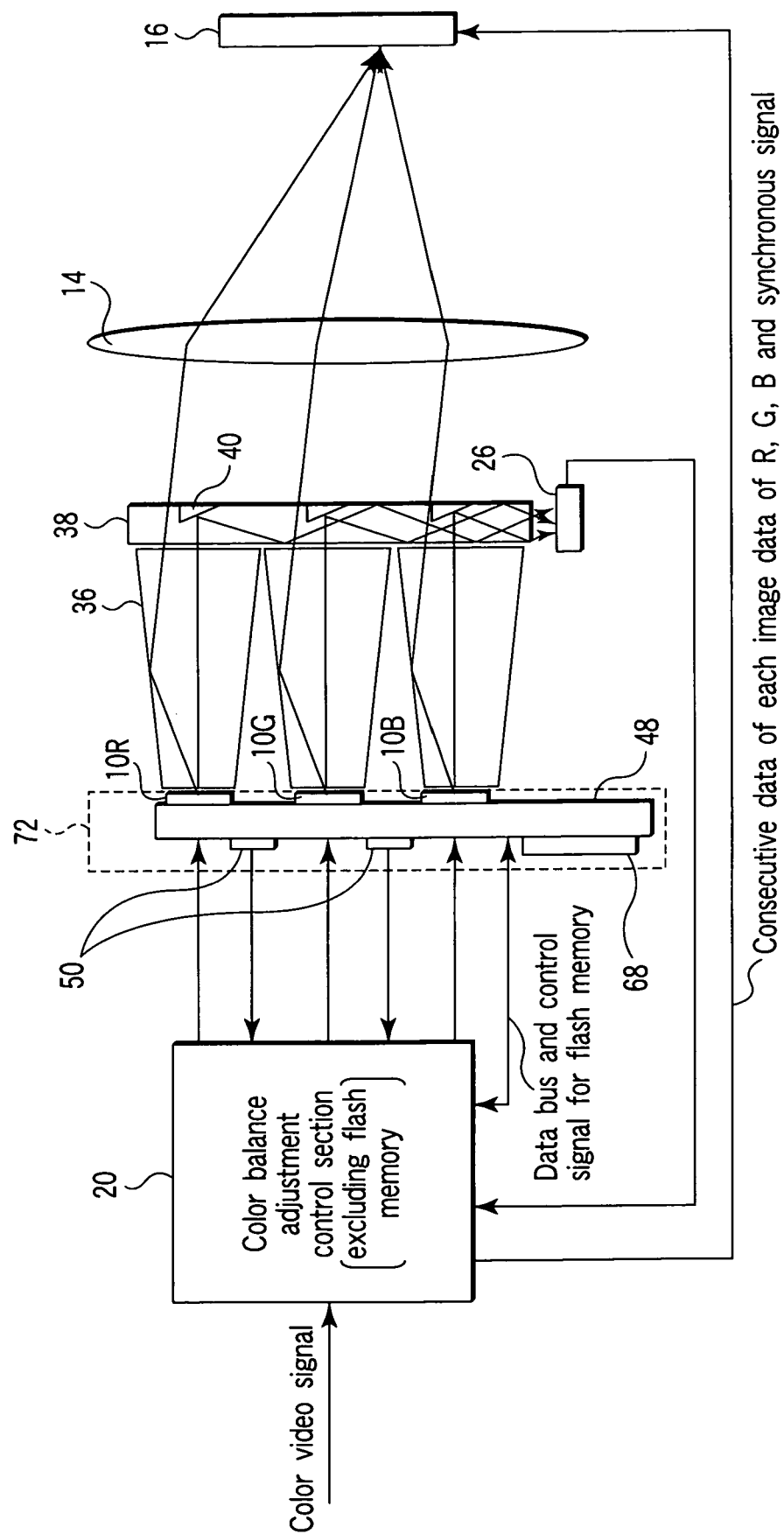
F I G. 36

DISPLAY APPARATUS, LIGHT SOURCE DEVICE, AND ILLUMINATION UNIT

CROSS-REFERENCE TO RELATED APPLICATIONS

This application is based upon and claims the benefit of priority from the prior Japanese Patent Application No. 2002-353902, filed Dec. 5, 2002, the entire contents of which are incorporated herein by reference.

BACKGROUND OF THE INVENTION

1. Field of the Invention

The present invention relates to a display apparatus capable of illuminating a light modulation device with a light from light emitting bodies such as a light emitting diode (hereinafter abbreviated as LED) to display an image on a display plane, a light source device for use in the display apparatus, and an illuminating unit which illuminates a region to be irradiated with the light from the light emitting body.

2. Description of the Related Art

Nowadays, an LED has won remarkable attention as a next-generation small-sized light emitting source. The LED has heretofore had advantages such as a small size, high resistance, and long life, but has mainly been used as indicator illumination for various measuring meters or a confirmation lamp in a control state because of restrictions on a light emitting efficiency and light emitting output. However, in recent years, the light emitting efficiency has rapidly been improved, and it is said to be a matter of time that the light emitting efficiency exceeds that of a high-pressure mercury lamp or a fluorescent lamp of a discharge type which has heretofore been assumed to have a high efficiency. Due to the appearance of the high-efficiency high-luminance LED, a high-output light emitting source using the LED has rapidly assumed a practicability. In recent years, a blue LED has been brought into a practical use stage in addition to conventional red and green LEDs, and this has also accelerated the application of the LED. In fact, a plurality of high-efficiency high-luminance LEDs have started to be practically used in a traffic signal lamp, large-sized full-color display for outdoors, various lamps for automobiles, and a backlight of a liquid crystal display of a cellular phone, although the practical use has heretofore been impossible in respect of brightness or efficiency.

The application of the high-efficiency high-luminance LED has been considered as a promising small-sized light emitting source of an illuminating unit which is requested to have a light condensing capability. The LED originally has characteristics superior to those of another light emitting source, such as life, durability, lighting speed, and lighting driving circuit. Furthermore, above all, blue is added, and three primary colors are all used in a self-light emitting source, and this has enlarged an application range of a full-color image display apparatus. Typical examples of the illuminating unit requested to have the light condensing capability include a projector display apparatus which forms and displays an image from image data. For the projector display apparatus, a desired primary color has heretofore been separated from a white system light emitting source via a color filter to subject the image data for each color to space light modulation, the data has been synthesized in space or time, and accordingly color image display has been possible. With the use of the white system light emitting source, since only one desired color is separated and used, colors other than the separated color are wasted/discarded by the filter in many cases. However, since the LED emits the light of a desired color, a necessary amount of light can be emitted when necessary. The light is not wasted, and the light of the light emitting source can efficiently be used as compared with a conventional white system light emitting source.

The superior application condition of the LED is noticed, and it is considered that the LED is also applied to the illuminating unit for the projector display apparatus as described in Jpn. Pat. Appln. KOKAI Publication No. 11-32278. In this case, a plurality of LEDs are arranged to bring the light for each LED in parallel with one another by a micro lens array. A light modulation device is illuminated by a reduced optical lens to constitute the projector device.

Moreover, as described in U.S. Pat. No. 6,227,669B1, a constitution has also been proposed for taking out output light from different LEDs (red (R) LED, green (G) LED, and blue (B) LED) by a light distribution lens array which is a light condensing optical system corresponding to each LED to superimpose the light from the plurality of LEDs upon the light modulation devices such as liquid crystal display by one superimposition lens.

Furthermore, as described in U.S. Pat. No. 6,318,863, a projector device is also proposed in which glass taper rods are disposed in the vicinity of the respective LEDs instead of the light distribution lens array to illuminate the light modulation device with the light from the rods by a superposition lens. This converts a luminous intensity distribution angle of the light emitted from the LED which is a plane light source and a diffused light source into a small luminous intensity distribution angle by the taper rods, and the efficiency of the illuminating of the light modulation device is improved.

Moreover, in recent years, as a display apparatus in a field of information display indoors or outdoors, a so-called full-color LED display system has rapidly started to spread in which the LED is used in each display body constituted of three color systems of red, green, and blue to constitute one pixel.

Various types of display apparatuses using the LED for each of red, blue, and green have been devised.

However, the LED has a large manufacturing fluctuation. Even when the same current is supplied to the LED, a constant brightness cannot be obtained in many cases. Therefore, in the display apparatus in which the LED is used, it is necessary to adjust a white balance at least at the time of the manufacturing.

As a method of solving the problems, the following methods have been proposed.

A display apparatus providing a high image quality has been proposed, for example, in U.S. Pat. No. 6,411,047 in which deviation to a basic color generated by the fluctuation in the manufacturing is corrected to eliminate color unevenness. This is a large-sized display apparatus constituted by integration of the pixels constituted by the three-color LEDs of red, green, and blue, a driving circuit for individually driving the LEDs of three colors of red, green, and blue is disposed in the device. Moreover, for example, when chromaticity of green that is a single light color deviates with respect to the chromaticity that is a standard of green, the LED of another color is allowed to emit the light, green is moved toward red or blue, and the chromaticity is adjusted so as to obtain an approximately standard chromaticity.

Moreover, a full-color display panel in which the LEDs of three primary colors of red, green, and blue are incorporated has a problem that the fluctuation of an emission intensity of each LED device is large and a uniform shade cannot be achieved. To solve the problem, in Jpn. Pat. Appln. KOKAI Publication No. 2001-343935, a panel has been proposed which is lit by a light driving circuit using an incorporated LED array. The emission intensity of the array is measured by a photoelectric conversion device, emission intensity to forward direction current characteristics specific to each LED device are obtained, and light driving is performed in accordance with a standard light intensity. Accordingly, it is possible to remove an individual difference fluctuation of the LED device, and a high-quality full-color display can be realized.

Furthermore, usual red, green, and blue system LEDs have a problem that each deterioration characteristic differs. As a display time elapses, that is, as an integrated display time increases, a reproduced color balance gradually collapses from an initial predetermined state, and a display color quality drops. To solve the problem, in Jpn. Pat. Appln. KOKAI Publication No. 2000-293133, a display apparatus has been proposed in which a full-color LED display system includes a monitor display portion to light white, the light emitted by the monitor portion is detected by an illuminance meter or a chromaticity meter, and the white balance and reproduced color balance can automatically be adjusted based on detected information.

Moreover, the examples of a method of correcting the white balance include the following disclosed examples. For example, in Jpn. Pat. Appln. KOKAI Publication No. 9-98443, a color correction device for use in color correction of data is disclosed in color image display apparatuses such as a full-color LED display panel and a color bulb display screen. This color correction device calculates hues of R, G, B data of an inputted CRT color image signal, and controls the lighting of the LEDs of R, G, B in consideration of a weighting factor in accordance with the hue.

BRIEF SUMMARY OF THE INVENTION

According to one aspect of the present invention, there is provided a display apparatus capable of illuminating a light modulation device with a light from a light emitting body to display an image on a display plane. The display apparatus comprises: a plurality of light emitting bodies different from one another in emitted light color (R, G, B); a light receiving device configured to detect the light from the light emitting bodies and to output an amount of light received; and a color balance adjustment control section configured to adjust and control a color balance in the display plane in accordance with the amount of light received by the light receiving device. The color balance adjustment control section is configured to be capable of identifying the emitted light color of the light emitting body relating to the amount of light received.

Moreover, according to another aspect of the present invention, there is provided a light source device for use in the display apparatus. In the light source device, the plurality of light emitting bodies (R, G, B), and a recording medium configured to record calibration data concerning the plurality of light emitting bodies are detachably and integrally held with respect to the display apparatus.

Furthermore, according to further aspect of the present invention, there is provided an illuminating unit which illuminates a region to be irradiated with a light from a light emitting body. The illuminating unit includes: a plurality of light emitting bodies (R, G, B) different from one another in emitted light color; a light receiving device configured to detect the light from the light emitting bodies and to output an amount of light received; and a color balance adjustment control section configured to adjust and control a color balance in the region. Moreover, the color balance adjustment control section is configured to be capable of identifying the emitted light color of the light emitting body relating to the amount of light received.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 7 is a timing chart concerning an emitted light amount adjustment control by the control of the supply current;

FIG. 8 is a timing chart concerning the emitted light amount adjustment control by the control of the supply current in consideration of limitations on the supply current;

FIG. 10 is a functional constitution diagram showing a constitution of the display apparatus according to a second embodiment of the present invention;

FIG. 11 is a perspective view showing an arrangement relation between LED and light receiving device;

FIG. 17 is a functional constitution diagram showing another constitution of the display apparatus according to the second embodiment;

FIG. 18 is a sectional view along line a–a' of FIG. 17;

FIG. 19 is an arrow view in a B direction of FIG. 18;

FIG. 20 is a functional constitution diagram showing still another constitution of the display apparatus according to the second embodiment, in which the light of each color is measured by one light receiving device via one light guide plate;

FIG. 36 is a functional constitution diagram showing a constitution of the display apparatus according to a fourth embodiment of the present invention;

DETAILED DESCRIPTION OF THE INVENTION

Figure 1:
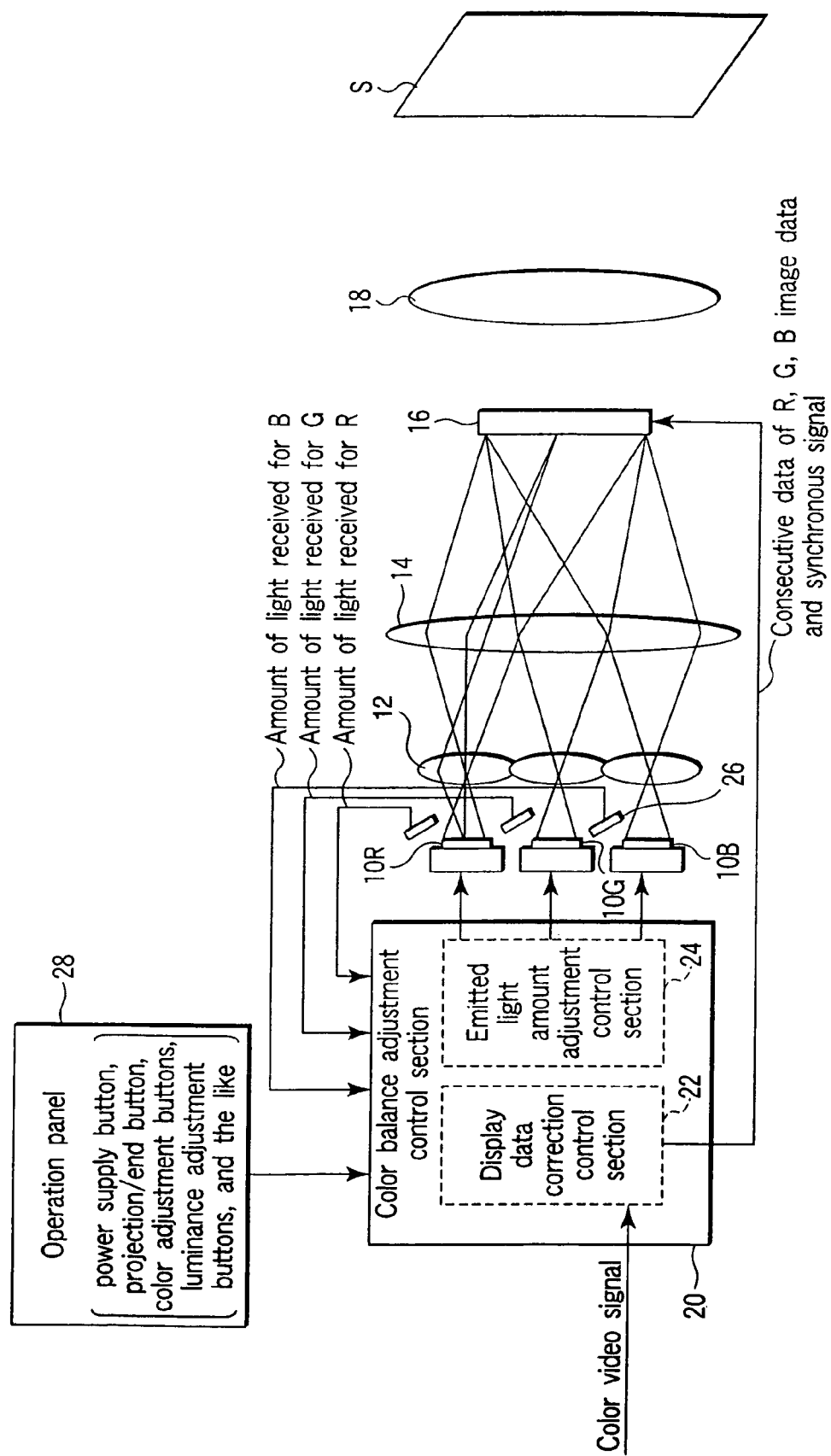
FIG. 1 is a functional constitution diagram showing a constitution of a display apparatus according to a first embodiment of the present invention.

Embodiments of the present invention will hereinafter be described with reference to the drawings As shown in FIG. 1, in a display apparatus according to a first embodiment of the present invention, output light from a plurality of LEDs 10 (R-LED 10R, G-LED 10G, and B-LED 10B) different from one another in emitted light color is taken out by a light distribution lens array which includes light condensing optical systems 12 for the respective LEDs 10. Moreover, the light from the plurality of LEDs 10 is superimposed upon a light modulation device 16 by a superposition lens 14. This constitution is similar to a projector device disclosed in U.S. Pat. No. 6,227,669 B1. Moreover, in the display apparatus, an image is displayed on the light modulation device 16 such as a transmission type LCD, and accordingly the displayed image is enlarged/projected on a screen S whish is the display plane by a projection lens 18.

Figure 2:
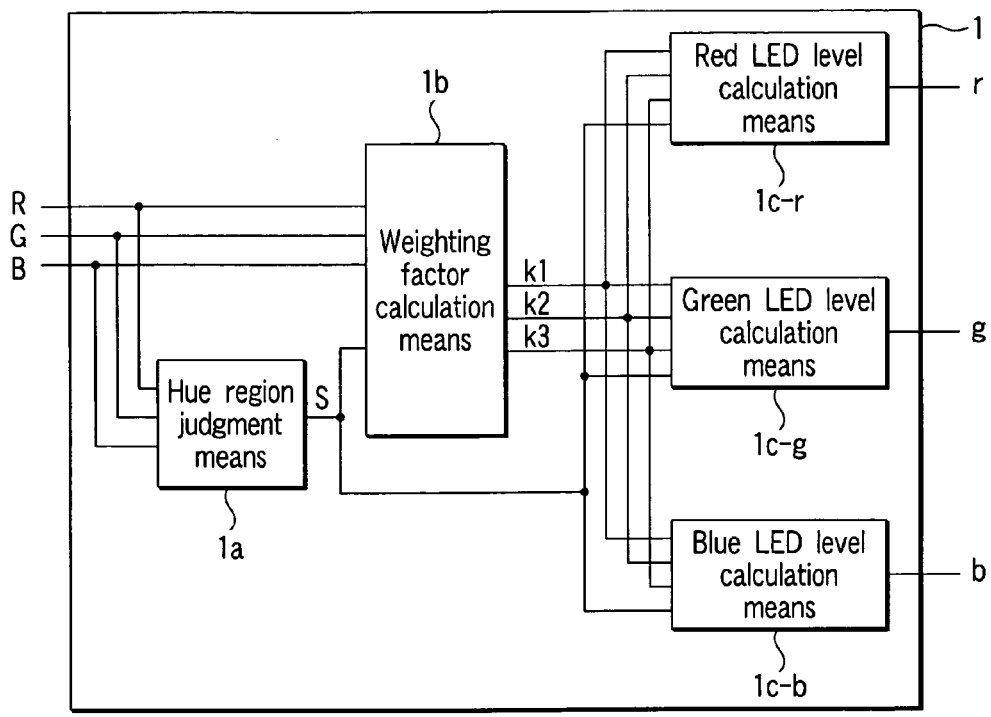
FIG. 2 is a block diagram of a conventional color correction device.

Here, the image displayed on the light modulation device 16 is each image data of R, G, B generated from a color video signal inputted into the display apparatus in a color balance adjustment control section 20. The image data is successively displayed in accordance with a light emitting timing of the LED 10 of the corresponding color. That is, the color balance adjustment control section 20 includes a display data correction control section 22 and an emitted light amount adjustment control section 24. The display data correction control section 22 produces each image data of R, G, B and a synchronous signal from the input color video signal to supply the data and signal to the light modulation device 16. The emitted light amount adjustment control section 24 lights the LED 10 of each color in response to the synchronous signal. It is to be noted that the emitted light amount adjustment control section 24 has a function similar to the color correction device disposed in Jpn. Pat. Appln. KOKAI Publication No. 9-98443. That is, a hue of R, G, B data of the inputted color video signal is calculated, and the lighting of the LED 10 for each of R, G, B is controlled in consideration of a weighting factor in accordance with the hue. Additionally, the color correction device disclosed in the Jpn. Pat. Appln. KOKAI Publication No. 9-98443 is shown in FIG. 2. That is, a color correction device 1 is constituted of: hue region judgment means 1a for judging six hue regions from CRT color video signals R, G, B to output a hue region signal S; weighting factor calculation means 1b for calculating and outputting weighting factors k1, k2, k3 from the CRT color video signals R, G, B and the hue region signal S; and LED level calculation means lc-lr, lc-lg, lc-b for calculating LED color image signals r, g, b from the hue region signal S and the weighting factors k1, k2, k3 by linear calculation. Moreover, when each hue region is subjected to predetermined linear calculation, pure color display is achieved with respect to white and three primary colors with a good white balance.

Moreover, at this time, the color balance adjustment control section 20 adjusts the image data supplied to the light modulation device 16 by the display data correction control section 22, or controls the lighting so as to adjust an amount of light emitted and light emitting timing of the LED 10 by the emitted light amount adjustment control section 24, so that the color balance in the surface of a screen S can be adjusted and controlled. In this case, in the present embodiment, a light receiving device 26 is disposed in the vicinity of each of the plurality of LEDs 10, and configured to detect the light from the corresponding LED 10 and to output an amount of light received. The amount of light received from each light receiving device 26 is supplied to the color balance adjustment control section 20, and the color balance adjustment control section 20 adjusts and controls the color balance based on each amount of light received.

It is to be noted that in FIG. 1, reference numeral 28 denotes an operation panel including a power supply button, projection/end button, color adjustment button, luminance adjustment button, and the like.

Figure 3:
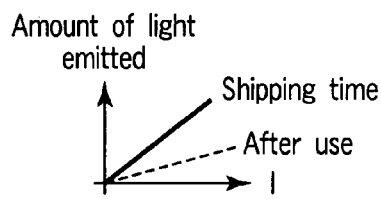
FIG. 3 is a diagram showing a relation between a supply current and an amount of light emitted by LED.
Figure 4:
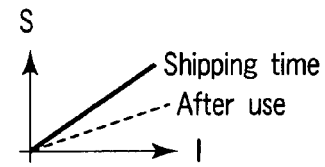
FIG. 4 is a diagram showing a relation between the supply current of the LED and an amount of light received by a light receiving device.
Figure 5:
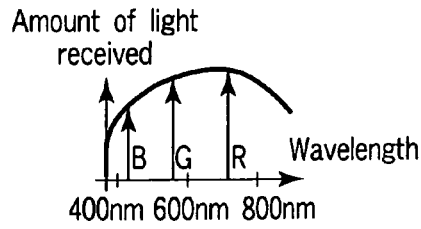
FIG. 5 is a diagram showing sensitivity characteristics of the light receiving device.

Additionally, for the LED 10, as shown in FIG. 3, a supply current I is correlated with the amount of light emitted. When the supply current I is doubled, the amount of light emitted is doubled. On the other hand, for the light receiving device 26, an amount of light received S has a linear relation with an output signal. Therefore, as a result, as shown in FIG. 4, the supply current I of the LED 10 has a linear relation with the amount of light received S of the light receiving device 26. Furthermore, for the LED 10, as shown by a broken line in FIG. 3, the amount of light emitted decreases in accordance with deterioration such as deterioration with age. Even in this case, as shown by a broken line in FIG. 4, the amount of light emitted S is assumed to be linear with respect to the supply current I. For sensitivity characteristics of the light receiving device 26, as shown in FIG. 5, when a light having the same power but a different wavelength is received, a size of each outputted signal differs.

Therefore, the display apparatus constituted in this manner is first subjected to the following calibration data acquisition process at the time of shipping.

1. When the color adjustment buttons of the operation panel 28 is depressed, the display apparatus executes the following.

2. White image data in which all pixels are white data (255, 255, 255) is supplied to the light modulation device 16, and the device is driven.

3. Standard supply currents Iri, Igi, Ibi are successively supplied to the LEDs 10 for R, G, B every 1/360 second to perform pulse lighting.

4. A projected image is displayed in white in the screen S, the light is measured by a chromaticity meter, and the white balance of synthesized light of each light is evaluated.

5. When the white balance deviates in an evaluation result, the amount of light emitted by the LED 10 for each color is adjusted so as to correct the deviation.

6. The adjustment is set and changed by the color adjustment button of the operation panel 28.

7. Moreover, the amount of light emitted is changed for each of R, G, B in accordance with the adjustment, and the amount of light emitted is changed by the change of the supply current.

In this case, supply currents Ir1, Ig1, Ib1 are successively supplied to the LEDs 10 for R, G, B every 1/360 second to perform the pulse lighting.

8. When the white balance is in an allowable range as a result of re-evaluation, amounts of light received Sr, Sg, Sb of the respective light receiving devices 26 for R, G, B, the supply currents Ir1, Ig1, Ib1, and lighting time Tr, Tg, Tb for R, G, B are stored in nonvolatile memories such as a flash memory.

In this case, the lighting time is Tr=Tg=Tb=1/360 seconds.

It is to be noted that the change of the amount of light emitted is not limited to the change of the supply current, and the pulse lighting time may also be adjusted for each of R, G, B. In this case, Tr, Tg, Tb stored in the flash memory sometimes indicate different times.

Next, after the shipping of the display apparatus, the apparatus is subjected to a calibration process at the time of use as follows. It is to be noted that various timings to perform the calibration process are considered, and will be described later in detail.

1. The power supply button of the operation panel 28 is turned ON.

2. The projection/end button is pressed to set a display state.

3. The data supplied to the light modulation device 16 to drive the device is set in accordance with the color video signal inputted from the outside so as to supply the image data of R, G, B.

4. The respective supply currents Ir1, Ig1, Ib1 are successively supplied to the LEDs 10 for R, G, B every 1/360 second to perform the pulse lighting.

5. Amounts of light received Sr1, Sg1, Sb1 are measured from the light receiving devices 26 disposed for the respective LEDs.

6. The white balance is evaluated in the following procedure.

That is, the amounts of light received Sr1, Sg1, Sb1 in the evaluation at a certain timing may satisfy the following.

$$Sg/Sr-\alpha < Sg1/Sr1 < Sg/Sr+\alpha \quad \text{Equation 1}$$

$$Sb/Sr-\beta < Sb1/Sr1 < Sb/Sr+\beta \quad \text{Equation 2}$$

7. When the evaluation result is NG, supply currents Ir2, Ig2, Ib2 are successively supplied to the respective LEDs 10 for R, G, B every 1/360 second to perform the pulse lighting, and the supply currents Ir2, Ig2, Ib2 are set in such a manner that obtained amounts of light received Sr2, Sg2, Sb2 satisfy the following equation 3. For example, when the currents are set in accordance with the following equations 4, 5, 6, it is possible to obtain results that satisfy Equation 3 in an early stage.

$$Sr, Sg, Sb=Sr2, Sg2, Sb2 \quad \text{Equation 3}$$

$$Ir2=Ir1 \quad \text{Equation 4}$$

$$Ig2=Ig1 \times (Sg/Sr)/(Sg1/Sr1) \quad \text{Equation 5}$$

$$Ib2=Ib1 \times (Sb/Sr)/(Sb1/Sr1) \quad \text{Equation 6}$$

Here, when the LED 10 is not deteriorated, Ir2=Ir1, Ig2=Ig1, Ib2=Ib1, and, needless to say, the white balance is the same as that at the time of calibration.

Moreover, when each LED 10 is deteriorated, Ir1>Ir2, Ig1>Ig2, Ib1>Ib2, but it is uncertain whether the white balance is attained. Here, when Sg/Sr=Sg1/Sr1 and Sb/Sr=Sb1/Sr1 are satisfied, each LED 10 is assumed to be deteriorated at the same ratio, and this indicates that the white balance is attained. Conversely, when the white balance is not attained, the amount of light emitted by each LED 10 is controlled so as to adjust and keep the balance of R, G, B in the above equation 11.

The above α, β indicate the information stored in ROM (not shown) in the color balance adjustment control section 20, and the information is read and used. Moreover, Sr, Sg, Sb and Ir1, Ig1, Ib1 are information read from the nonvolatile memory.

Moreover, even when the white balance is again controlled, the above-described control is similarly executed by the calibration information at a time when the white balance in the surface of the screen S is attained.

Next, a method of controlling actual white balance will be described. The examples of this method include: display data correction (first control method); control of the supply current (second control method); control of the lighting time (third control method); and the like. The respective methods will hereinafter be described.

Figure 6:
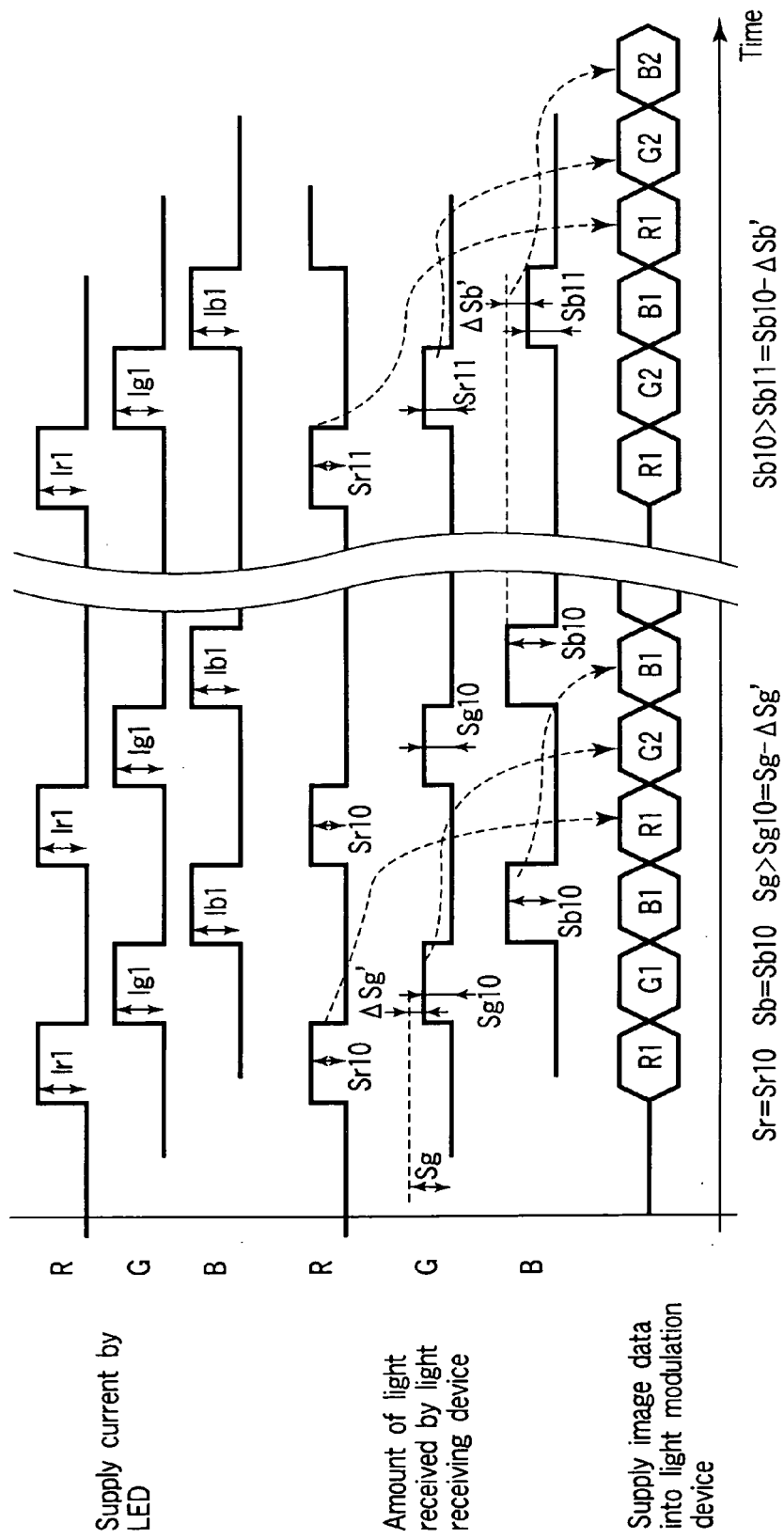
FIG. 6 is a timing chart concerning display data correction control.

FIG. 6 shows a timing chart of the adjustment of the white balance in the surface of the screen S (i.e., the first control method). Instead of controlling the amount of light emitted by the LED 10 by the emitted light amount adjustment control section 24, the image data is converted by the display data correction control section 22 to adjust the white balance. That is, the emitted light amount adjustment control section 24 supplies the supply currents Ir1, Ig1, Ib1 so as to successively pulse-light the LEDs for the respective colors 10R, 10G, 10B. At this time, levels of the supply currents Ir1, Ig1, Ib1 for the pulse lighting are constant. Therefore, the amount of light emitted by each LED 10 is supposed to be constant. However, as described above, the LED is deteriorated with age, and the amount of light emitted gradually drops. Therefore, the amount of light received in the corresponding light receiving device 26 gradually differs from the amounts of light received Sr, Sg, Sb stored in the nonvolatile memories such as the flash memory. Then, the display data correction control section 22 compares the amounts of light received by the respective light receiving devices 26 with the amounts of light received Sr, Sg, Sb, and converts the image data to be supplied to the light modulation device 16 in accordance with the ratio.

For example, when amounts of light received Sr10, Sg10, Sb10 in the respective light receiving devices 26 are obtained, it is assumed that Sr=Sr10, Sb=Sb10, Sg>Sg10 (=Sg−ΔSg'). In this case, among the image data to be supplied to the light modulation device 16, R and B data are supplied as R1 and B1 as such. On the other hand, for G data, thereafter G1 is converted to G2 (G2>G1) to supply the data. It is to be noted that at this time, instead of the amounts of light received Sr, Sg, Sb at the time of the shipping, new amounts of light received Sr10, Sg10, Sb10 are stored as the calibration information in the nonvolatile memory.

Therefore, when the white balance is controlled later again, these amounts of light received Sr10, Sg10, Sb10 are used as comparison objects. For example, it is assumed that amounts of light received Sr11, Sg11, Sb11 obtained by the respective light receiving devices 26 at the time of this re-control have a relation of Sr10=Sr11, Sb10>Sb11 (=Sb10−ΔSb'), Sg10=Sg11. In this case, among the image data to be supplied to the light modulation device 16, the R and G data are supplied as R1 and G2 as such. For the B data, thereafter B1 is converted to B2 (B2>B1) to supply the data. It is to be noted that at this time, instead of the amounts of light received Sr10, Sg10, Sb10, new amounts of light received Sr11, Sg11, Sb11 are stored as the calibration information in the nonvolatile memory, and are prepared for the next white balance control.

As described above, when the display data correction control section 22 converts the image data, it is possible to adjust the white balance in the screen S surface.

FIG. 7 shows a timing chart of the adjustment of the white balance in the screen S surface (i.e., the second control method). Instead of controlling the image data by the display data correction control section 22, the amount of light emitted by the LED 10 is controlled by the emitted light amount adjustment control section 24. Especially, emission intensity is controlled by the control of the supply current to adjust the white balance. That is, the emitted light amount adjustment control section 24 supplies supply currents Ir11, Ig11, Ib11 so as to successively pulse-light the LEDs 10R, 10G, 10B for the respective controls. At this time, when amounts of light received Sr21, Sg21, Sb21 obtained by the respective light receiving devices 26 have a relation of Sr=Sr21, Sb=Sb21, Sg>Sg21 (=Sg−ΔSg'), the emitted light amount adjustment control section 24 supply currents Ir12 and Ib12 at the next timing of each color at the same levels as those of the supply currents Ir11 and Ib11 at this time. On the other hand, for the supply current Ig12 into the G-LED 10G, the level is increased as compared with that of the previous supply current Ig11, and the supply current is supplied to increase the emission intensity of the G-LED 10G. With this increase amount of the supply current, the amount of light received Sg22 of the corresponding light receiving device 26 obtained after this increase is Sg=Sg22. It is to be noted that at this time the image data to be supplied to the light modulation device 16 are not converted, and remain to be R1, G1, B1.

As described above, when the emitted light amount adjustment control section 24 controls the supply current of the LED 10, it is possible to adjust the white balance in the screen S surface.

Additionally, in general, the supply current into the LED 10 needs to be limited in consideration of various factors which influence the capability of the LED 10, such as an ambient temperature, pulse lighting time, and pulse interval. Even when the emission intensity is controlled by the control of the above-described supply current, the supply current needs to be set in consideration of the limitation. That is, with the deterioration of the LED 10, the amount of light at a time when the white balance is obtained in accordance with the deterioration needs to be controlled in an attenuating direction.

This will be described with reference to FIG. 8. In the first setting, at least one of the supply currents Ir11, Ig11, Ib11 of the LEDs 10R, 10G, 10B is supposed to be set to an upper limit. However, thereafter the same amount of light emitted cannot be obtained because of the deterioration of the LED, even when the same supply current is passed. Assuming that this LED is the G-LED 10G, when a current of Ig11 or more is passed through the G-LED 10G, failure is caused. To solve the problem, in the control shown in FIG. 7, the supply current Ig11 is controlled so as to increase to Ig12, but here Ig11 is fixed at the upper limit to prevent the failure from being caused. Conversely, Ir1, Ib1 are decreased to adjust the white balance.

Assuming that the limitation of the G-LED 10G is Ig11, supply currents Ir12, Ig12, Ib12 are determined by the following equations.

$Ir12=Ir11 \times Sg21/Sg$ (additionally, $Sr=Sr21$)      Equation 13

$Ig12=Ig11$      Equation 14

$Ib12=Ib11 \times Sg21/Sg$ (additionally, $Sb=Sb21$)      Equation 15

Accordingly, the LED can be controlled without any failure, and, needless to say, the life of the LED can be made long.

Conversely, when there is a margin in the supply current into each LED 10 with respect to the limitation, as shown in FIG. 7, the supply current is increased so as to increase the amount of light. Accordingly, a bright display can be obtained in a state in which the white balance is attained.

Figure 9:
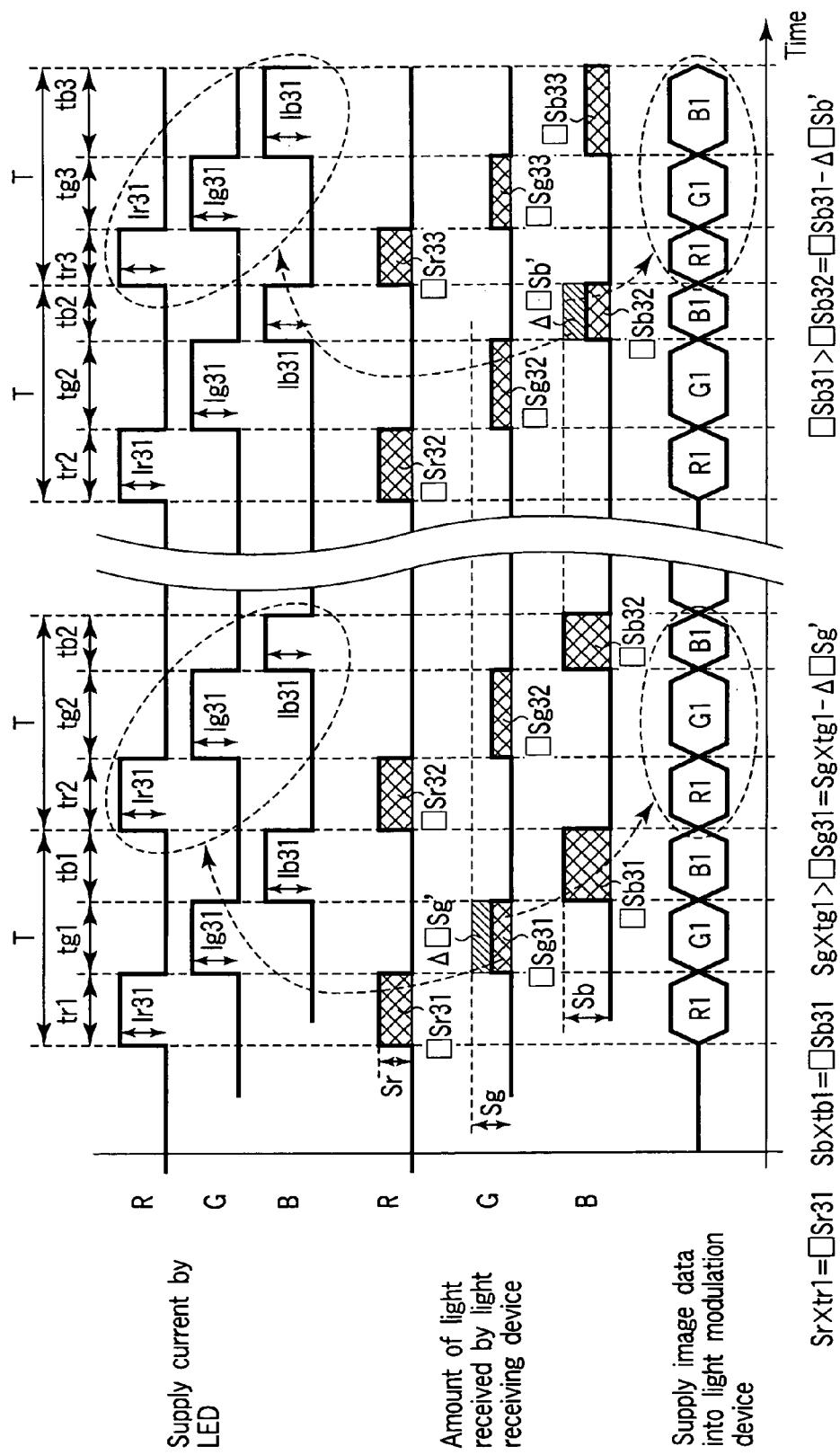
FIG. 9 is a timing chart concerning the emitted light amount adjustment control by the control of a lighting time.

FIG. 9 shows a timing chart in a case (i.e., the third control method) in which when the emitted light amount adjustment control section 24 controls the amount of light emitted from the LED 10, the lighting time in the pulse lighting is controlled to adjust the white balance in the screen S surface. That is, the emitted light amount adjustment control section 24 supplies supply currents Ir31, Ig31, Ib31 for a time tr1, tg1, tb1 (tr1=tg1=tb1) so as to successively pulse-light the LEDs for the respective colors 10R, 10G, 10B. At this time, integrated values □Sr31, □Sg31, □Sb31 of the amounts of light received Sr31, Sg31, Sb31 obtained by the respective light receiving devices 26 preferably satisfy □Sr31:□Sg31:□Sb31=Sr, Sg, Sb. Here, if Sr×tr1=□Sr31, Sb×tb1=□Sb31, Sg×tg1>□Sg31 (=Sg×tg1−Δ□Sg'), the emitted light amount adjustment control section 24 sets the supply time of the supply current Ig31 into the G-LED 10G at the next timing to tg2 which is longer than the previous supply time tg1, changes tr2, tb2 to be shorter than tr1, tb1, and keeps a period T to be constant. Therefore, the supply time tg2 is not set to such a time that the integrated value □Sg32 of the obtained amount of light received Sg32 is equal to Sg×tg1 described above, and is fixed to such a time that a balance is attained with integrated values □Sr32, □Sb32 decreased as compared with the previous integrated values □Sr31, □Sb31 (i.e., the white balance is attained) by the decrease of the supply time of the supply current Ir31, Ib31 of the other colors. Moreover, at this time, the display data correction control section 22 does not convert the image data of each color, but the supply time into each light modulation device 16 is adjusted in accordance with the time of the changed supply current.

Moreover, in another case, for example, in a case where □Sb31>□Sb32=□Sb31−Δ□Sb' as shown on the right side of FIG. 9, the time can be adjusted in the same manner as described above.

When the lighting time of the LED 10 is controlled by the emitted light amount adjustment control section 24 as described above, it is possible to adjust the white balance in the screen S surface.

In the first embodiment described above, the white balance in the screen S surface is adjusted based on the amount of light received which is measured by the light receiving device 26. A device including a wavelength detection function of measuring spectral characteristics in addition to the amount of light, or measuring a change of wavelength of light in accordance with the characteristics may also be used to adjust the white balance based on the wavelength. That is, the wavelength of the light emitted from the LED 10 sometimes changes by the change of a supplied current amount or a temperature, or by the change with age. Therefore, the change is detected by the light receiving device 26, and the white balance is adjusted in consideration of the wavelength. In this case, for the adjustment of the white balance, either one or both of the display data correction control section 22 for correcting and controlling the image data supplied to the light modulation device 16 with respect to the color video signal, and the emitted light amount adjustment control section 24 for controlling the amount of light emitted by the LED 10 may be used to adjust the white balance.

Moreover, the present invention is not limited to the white balance. For example, the color balance adjustment control section 20 adjusts the color in the screen S surface with respect to the specific R, G, B data to obtain a desired color. In accordance with the adjustment, the inputted color video signal may be adjusted and projected onto the screen S surface.

Next, a second embodiment of the present invention will be described. In the second embodiment of the present invention, the number or positions of light receiving devices 26 to be arranged will be described. As shown in the functional constitution diagram of FIG. 10 and the perspective view of FIG. 11, one light receiving device 26 is disposed in the vicinity of a micro lens which is the light condensing optical system 12 and at equal distance from the plurality of LEDs 10R, 10G, 10B. That is, among the light of the colors emitted from the respective LEDs 10R, 10G, 10B, unnecessary light that cannot be focused on the screen S surface is received by the light receiving device 26.

Figure 12:
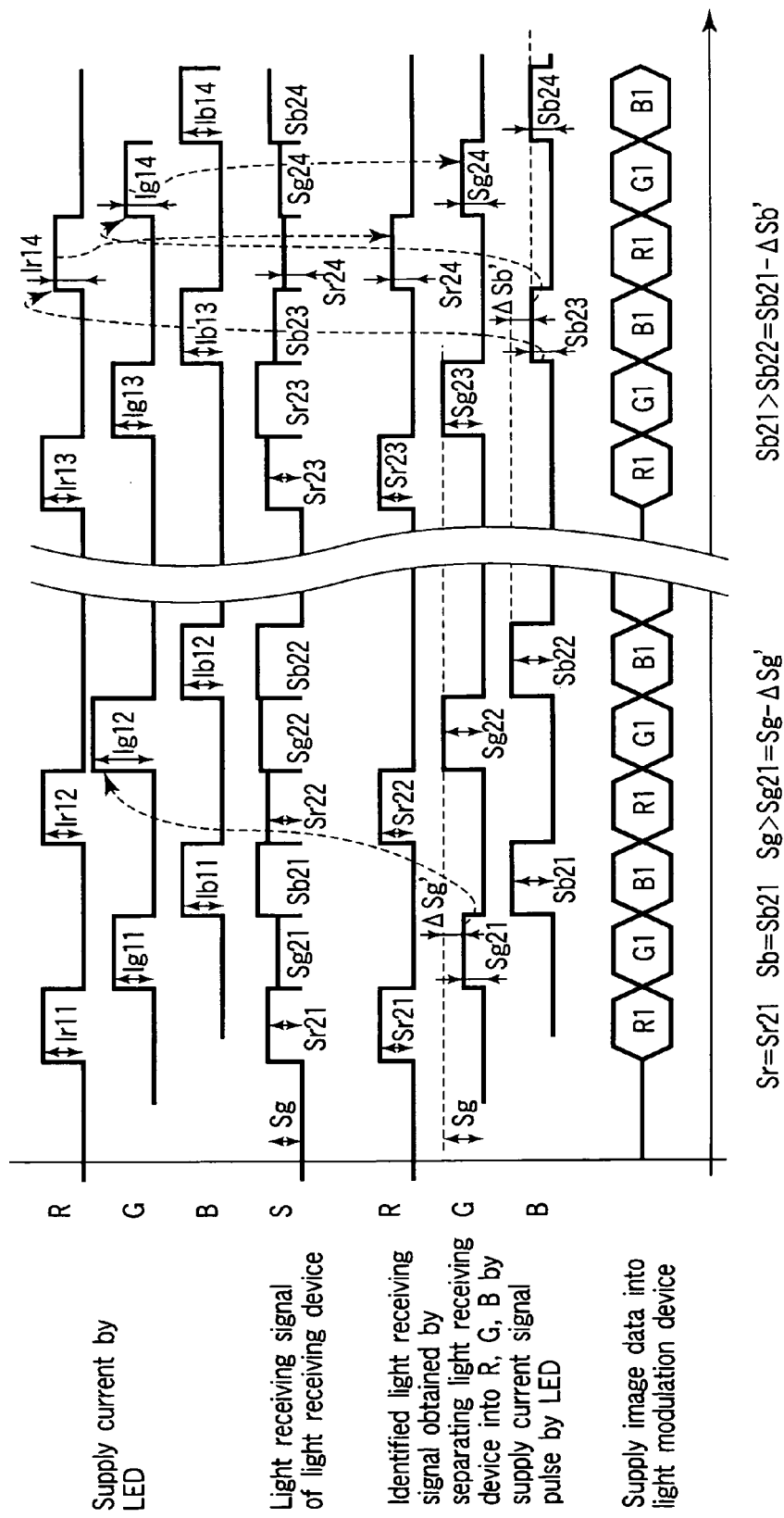
FIG. 12 is a timing chart concerning the emitted light amount adjustment control in the second embodiment.

In this case, the respective LEDs 10R, 10G, 10B successively pulse-light, but the unnecessary light of each color is received by one light receiving device 26, and therefore only one light receiving signal from the light receiving device 26 is obtained as shown in FIG. 12. That is, the light receiving signal obtained by time-division multiplexing R, G, B is inputted into the color balance adjustment control section 20. Then, the color balance adjustment control section 20 separates the light receiving signal from the light receiving device 26 by a supply current signal pulse by LED, that is, separates the signal at the timing of emission of each of the LEDs 10R, 10G, 10B to identify the light receiving signal of each of the LEDs 10R, 10G, 10B. Moreover, based on the separated and identified light receiving signal for each color, the color balance can be adjusted by the display data correction control, supply current control, or lighting time control as described above in the first embodiment.

Figure 14:
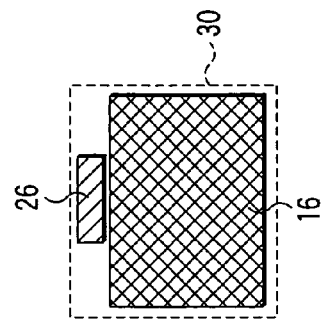
FIG. 14 is an explanatory view of a position of the light receiving device around a light modulation device.
Figure 13:
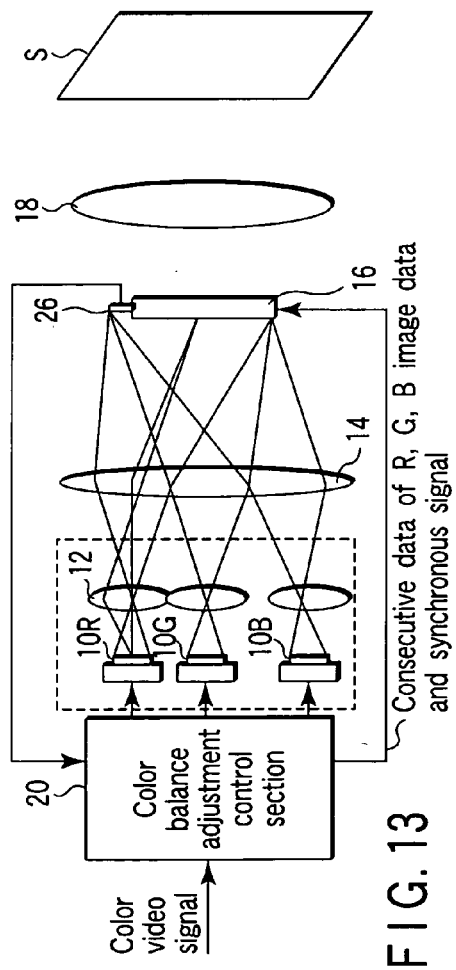
FIG. 13 is a functional constitution diagram showing another constitution of the display apparatus according to the second embodiment.

Moreover, the light receiving device 26 may also be disposed in a position where the light around the light modulation device 16 is detected as shown in FIGS. 13 and 14. That is, when an illuminating area 30 having the same shape and size as those of the light modulation device 16 are not obtained, the light with which the light modulation device 16 is not irradiated is the unnecessary light. When the light receiving device 26 is disposed so as to receive the unnecessary light, the light can be received around the light modulation device 16 to which stable illuminating is applied, and a stable amount of light received can be obtained. Moreover, the amount of light received is obtained around the light modulation device 16 including factors of optical components including the LED 10 to light modulation device 16, and the color balance can accurately be corrected in accordance with the factors by the optical components.

It is to be noted that since one light receiving device 26 is used also in this case, needless to say, it is necessary to separate and identify the light receiving signal of each color from the RGB time-division multiplexed light receiving signals.

Figure 16:
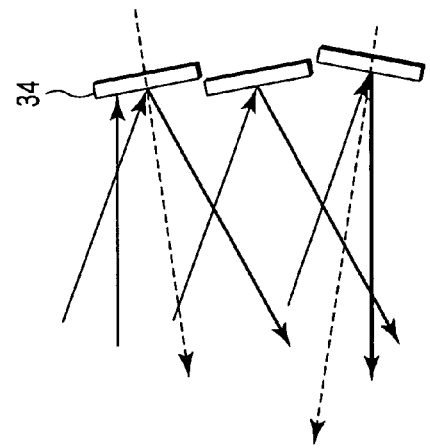
FIG. 16 is an enlarged view of a mirror section of the DMD.
Figure 15:
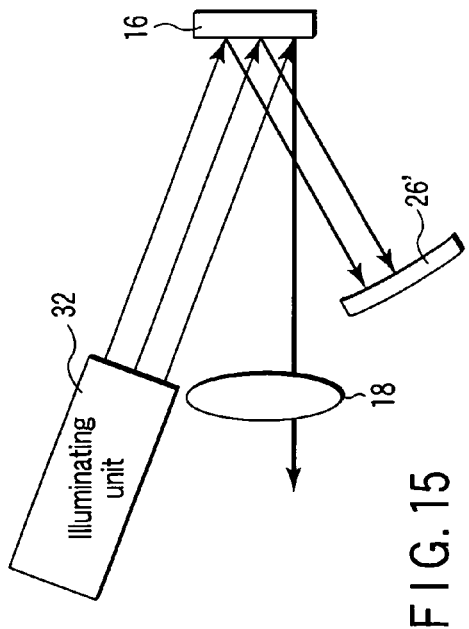
FIG. 15 is an explanatory view of the light receiving device of a projection display apparatus using DMD which is still another constitution of the display apparatus according to the second embodiment.

Furthermore, as shown in FIG. 15, when the light modulation device 16 is a projection display apparatus using DMD, the light receiving device 26 may also be constituted as a light receiving device 26' that also serves as a douser. Here, DMD is a mirror plane deflection type light modulator known as a trademark Digital Micromirror Device. The details of the DMD are disclosed, for example, in Jpn. Pat. Appln. KOKAI Publication No. 11-32278 or U.S. Pat. No. 6,129,437. The DMD modulates R, G, B light successively incident from an illuminating unit 32 including the LED 10, light condensing optical systems 12, superposition lens 14, and the like. That is, as shown in FIG. 16, the DMD includes a plurality of micro mirror plane devices (illuminating units 34) for deflecting R, G, B incident light in two different directions including a first direction in which video corresponding to the image data can be displayed on a display plane and a second direction different from the first direction to modulate the light.

Here, the light receiving device 26' which also serves as the douser receives the light of the second direction, so-called OFF light, and accordingly the light can easily be received. Furthermore, the light receiving device 26' receives the image having a negative state on the screen S surface as the OFF light. Therefore, when the screen surface is brought in a black display state, the light receiving device 26' can receive a maximum light amount, and can receive the intense light, and errors caused by noise can be reduced.

There is a minimum period in which the angles of all the illuminating units 34 are fixed in the DMD for modulating a pulse width. The color balance adjustment control section 20 calculates the amount of light emitted in the LED 10 in accordance with the amount of light received by the light receiving device 26' and the number of illuminating units 34 indicating OFF in a case where one illuminating unit 34 is in an OFF state in the minimum period for each color of R, G, B. Moreover, a difference between the calculated amount of light emitted and the first amount of light emitted is calculated for each of R, G, B to adjust and control the color balance.

Moreover, to display the image in response to the video signal and to adjust and control the balance for the calibration, the image is displayed in response to the video signal, and the image in a negative state is received by the light receiving device 26'. In this case, considering that the actual amount of light received is based on the image in the negative state, the color balance adjustment control section 20 calculates the corresponding corrected amount of light received at the time of the black display to correct the color balance.

Instead of the light distribution lens array which is the light condensing optical systems 12, taper rods 36 having rectangular sections may be disposed in front of the LEDs 10 for the respective colors as shown in FIGS. 17 to 19. Moreover, a light guide plate 38 which is a light guiding member is disposed on an emission surface of each of these taper rods 36, and the light of each color is guided and received by the light receiving device 26 for each color. Here, the light guide plate 38 includes: a cutout 40 for bending an optical path of a part of an outgoing light from the taper rod 36; and a reflective film 42 for reflecting the light bent by the cutout 40 in the light guide plate 38. Moreover, since the color balance adjustment control section 20 can specify the light receiving device 26 by the light receiving signal, and can therefore identify the color in accordance with the light receiving device identification information to specify the light receiving device, it is not necessary to separate the light at the above-described emission timing.

When a part of an actual illuminative light is detected, the change of the factor caused in the optical path in the screen S surface can also be detected from the actual LED 10, and the color balance can securely be adjusted.

Moreover, as shown in FIG. 20, needless to say, the light of the respective colors may also be measured using one light guide plate 38 and one light receiving device 26. Additionally, in this case, it is necessary to separate the light receiving signal by the lighting of R, G, B pulses.

Figure 21:
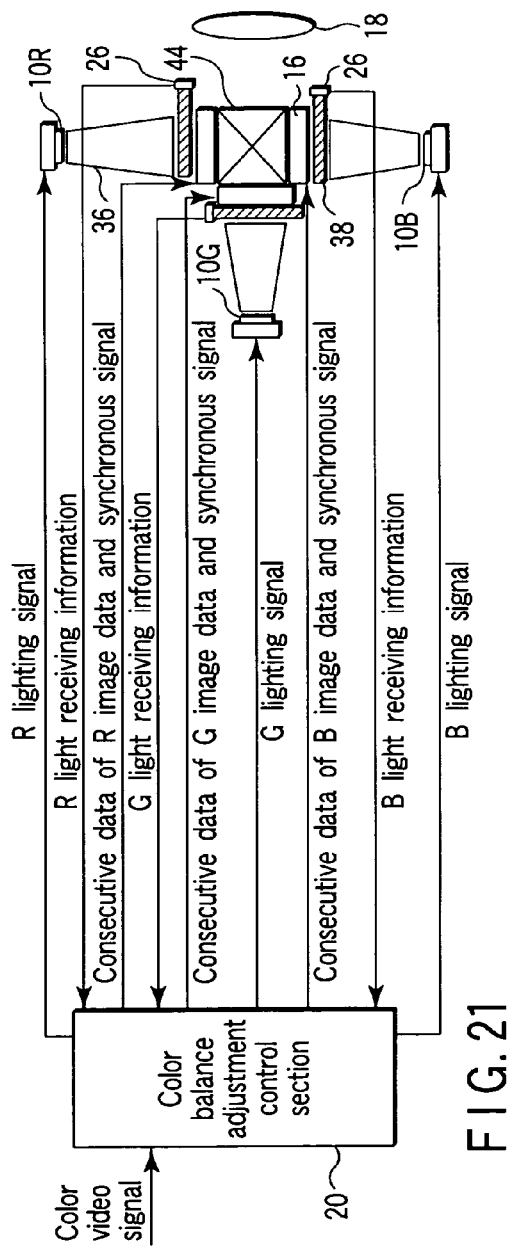
FIG. 21 is a functional constitution diagram showing another constitution of the display apparatus according to the second embodiment, in which the light receiving device for each color is disposed in an optical path different with each color.

Furthermore, as shown in FIG. 21, different optical paths may also be disposed for the respective colors, and the light receiving devices 26 for the respective colors may be disposed. That is, the light modulation device 16 for each color is irradiated with the light from the LED 10 via the taper rod 36 for each color, and each modulated light is bent by a dichroic prism 44, and projected onto the screen S by the projection lens 18. In this case, as shown in FIGS. 17 to 19, the light guide plate 38 is disposed between the taper rod 36 and the light modulation device 16, and the light is received by the light receiving device 26 for each color.

Figure 22:
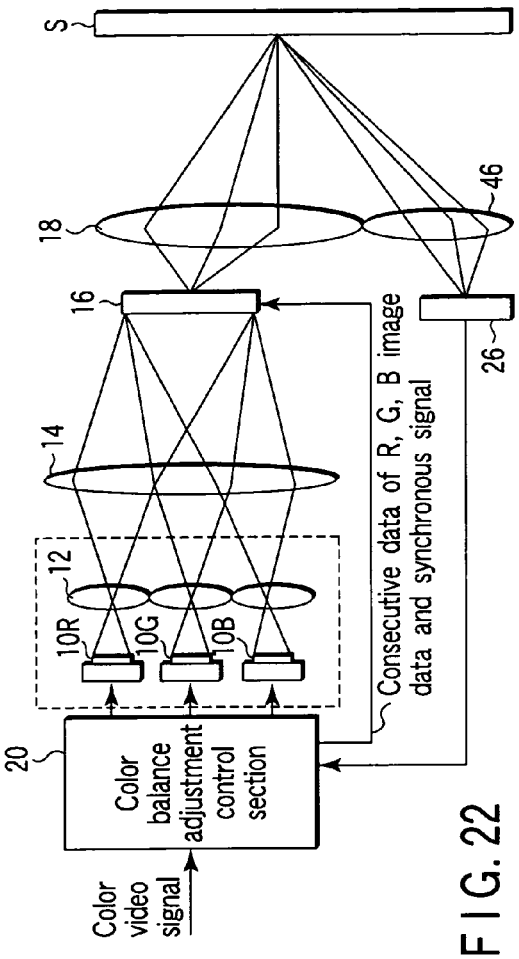
FIG. 22 is a functional constitution diagram showing still another constitution of the display apparatus according to the second embodiment, in which the light projected on the display plane (screen) is detected with a camera.

Moreover, as shown in FIG. 22, another constitution is considered in which the light projected onto the screen S that is the display plane is detected by the light receiving device 26 via an image pickup lens 46 that is an optical member capable of focusing the light of a display region of the display plane. In this constitution, when the light of the display region of the display plane is focused, the change of the color by outside light or color balance deterioration by the color of a wall on the display plane can be detected, and the color balance can be controlled to be optimum. Moreover, since the light modulated by the light modulation device 16 is detected, the color balance can be adjusted with respect to various data such as each intermediate color supplied as the video signal.

Next, a third embodiment of the present invention will be described. In the third embodiment, the control timing of the color balance adjustment control section 20 will be described in accordance with various examples in detail.

Figure 23:
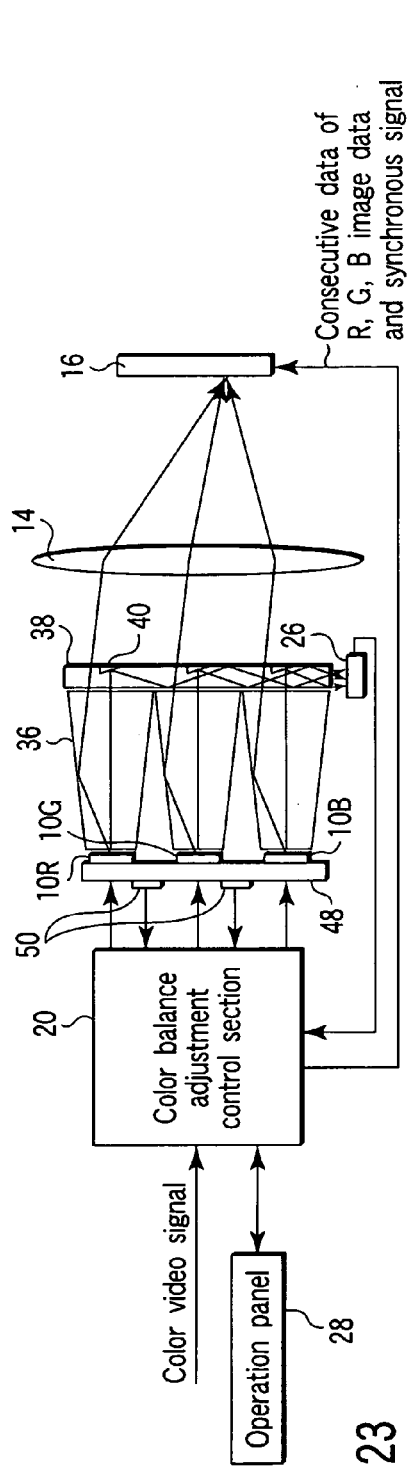
FIG. 23 is a functional constitution diagram showing the constitution of the display apparatus with a temperature sensor, which is the display apparatus according to a third embodiment of the present invention.

As shown in FIG. 23, the display apparatus according to the third embodiment has substantially the same constitution as that shown in FIG. 20, but an LED substrate 48 on which the respective LEDs 10 are mounted is integrally constituted. Moreover, temperature sensors 50 are disposed on the surface (back surface) of the LED substrate 48 opposite to an LED mounting surface.

Figure 24:
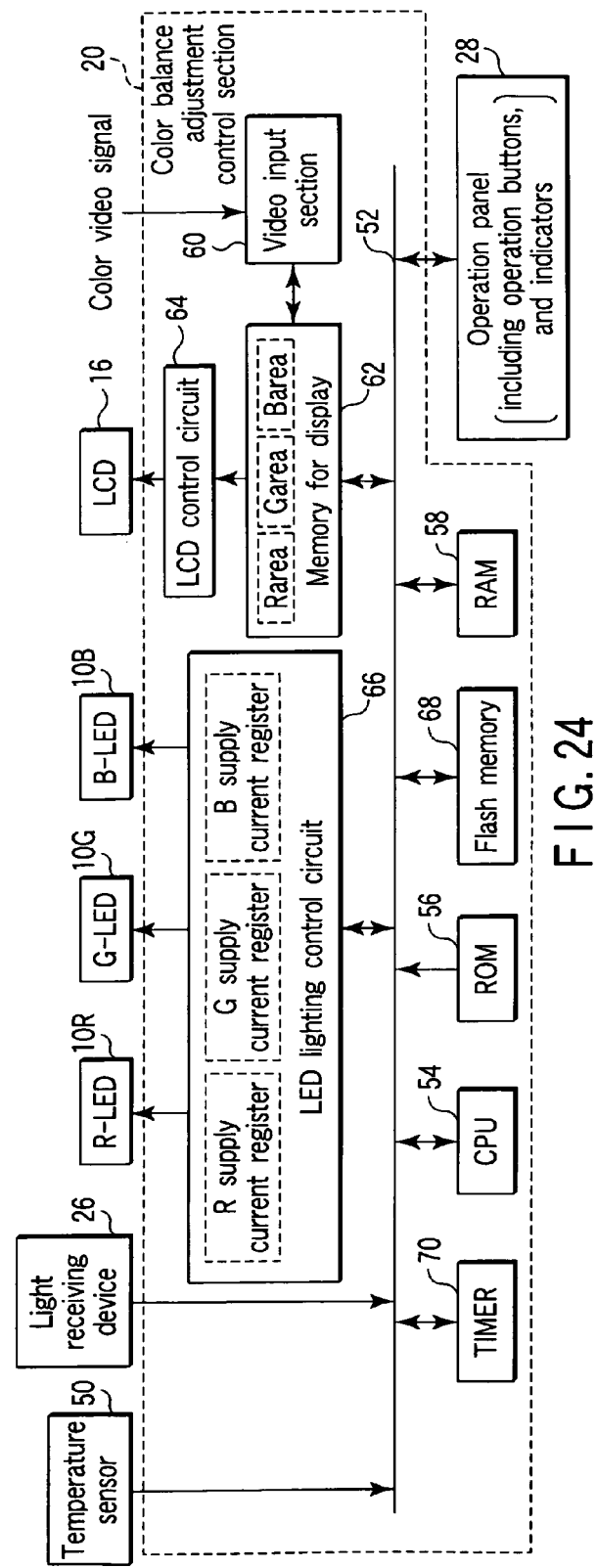
FIG. 24 is a block diagram showing a detailed constitution of a color balance adjustment control section.

As shown in FIG. 24, the color balance adjustment control section 20 is constituted of a bus 52, CPU 54, ROM 56, RAM 58, video input section 60, memory for display 62, LCD control circuit 64, LED lighting control circuit 66, flash memory 68, and TIMER 70. Moreover, the CPU 54 is connected to the ROM 56, RAM 58, memory for display 62, LED lighting control circuit 66, flash memory 68, and TIMER 70 in the color balance adjustment control section 20, and the light receiving device 26, operation panel 28, and temperature sensors 50 outside the color balance adjustment control section 20 via the bus 52.

Here, the CPU 54 controls the whole color balance adjustment control section 20. For this, program or various control data is stored in the ROM 56, and the RAM 58 is used as a work memory of the CPU 54.

The video input section 60 inputs the color video signal to be projected/displayed, and develops the image data for display in the memory for display 62. Here, the memory for display 62 includes R area, G area, and B area, and the image data is developed separately for each of R, G, B. The LCD control circuit 64 drives and controls the LCD which is the light modulation device 16 based on the image data developed in the memory for display 62. That is, the memory for display 62 and the LCD control circuit 64 function together with the CPU 54 as the display data correction control section 22 described above in the first embodiment. When the white balance is adjusted by the display data correction control, the CPU 54 reads the image data of each color developed in the R area, G area, and B area of the memory for display 62 by the video input section 60, performs necessary correction with respect to the data, and thereafter writes the data back into the R area, G area, and B area again. In this manner, the LCD is driven and controlled based on the corrected image data.

Moreover, the LED lighting control circuit 66 controls the lighting of the R-LED 10R, G-LED 10G, and B-LED 10B. The LED lighting control circuit 66 includes an R supply current register, G supply current register, and B supply current register in which the supply current amount into each LED 10 is stored. That is, the LED lighting control circuit 66 functions together with the CPU 54 as the emitted light amount adjustment control section 24 described above in the first embodiment. To perform the white balance adjustment by the supply current control, the CPU 54 can write appropriate current values into the R, G, and B supply current registers to control the amount of light emitted by each LED 10. The CPU 54 can also control a current supply timing into each LED 10 by the LED lighting control circuit 66, and a continuing time to adjust the white balance by the lighting time control.

The flash memory 68 records the calibration information subjected to the white balance adjustment in a nonvolatile manner. The TIMER 70 is a timer counter for counting time.

Figure 25:
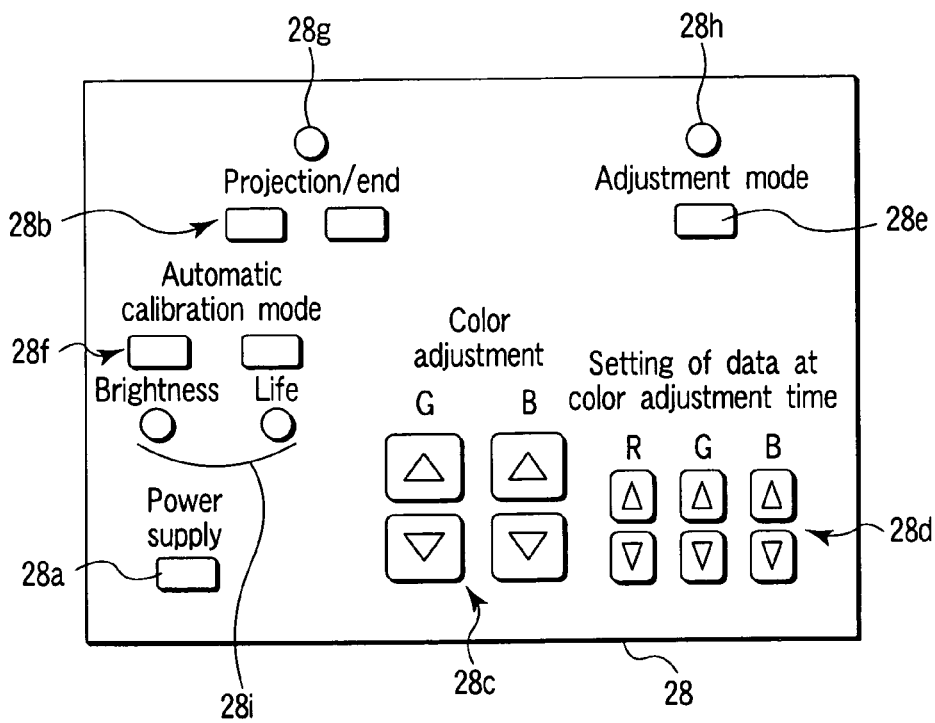
FIG. 25 is a diagram showing an operation panel.

As shown in FIG. 25, a power supply button 28a, projection/end button 28b, color adjustment buttons 28c, setting buttons of data at the time of color adjustment 28d, adjustment mode button 28e, and automatic calibration mode buttons 28f are arranged in the operation panel 28. For some of the operation buttons, indicators 28g, 28h, 28i lit in response to the operation are arranged in the vicinity of the buttons. It is to be noted that the projection/end button 28b is constituted of a button for instructing the projection, and a button for instructing projection end. The indicator 28g lights at the time of the projection in response to the operation of the button for instructing the projection.

The color adjustment buttons 28c are up/down buttons for G and B, because G and B colors are adjusted with respect to R color. That is, the button functions as a color balance target value setting section capable of setting a desired color balance in the adjustment of the color balance in the display plane. The setting buttons 28d of the data at the time of the color adjustment are buttons for setting an optional color instead of white. Therefore, the up/down buttons for adjustment of each of R, G, B are included. Accordingly, gradation values for R, G, B are set as absolute values. Additionally, here, since a setting or calibrating flow is similar to that of white, the description thereof is omitted.

The adjustment mode button 28e is a button for instructing switch between a usual user mode and white balance adjustment mode. The indicator 28h is lit by the operation of the adjustment mode button 28e to obtain the white balance adjustment mode. The automatic calibration mode buttons 28f include a brightness button and a life button in order to select whether the brightness or the LED life is preferentially adjusted to automatically calibrate the white balance at the time of the usual use mode. Moreover, two indicators 28i are disposed for the brightness and life buttons, and are lit in response to the operation of the corresponding button.

Figure 26:
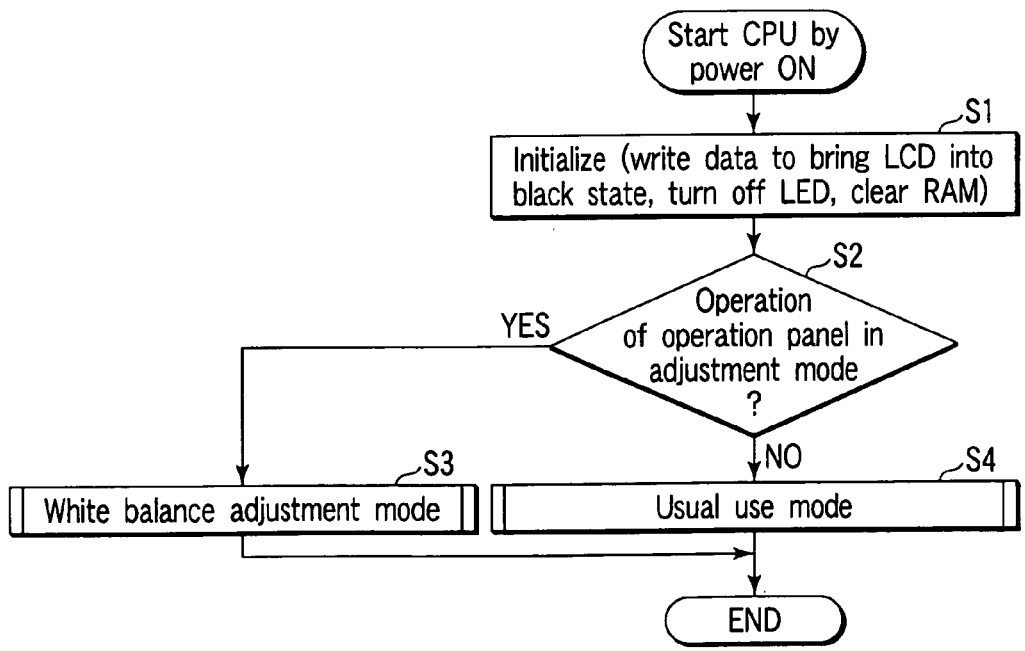
FIG. 26 is a flowchart of a main routine of the display apparatus according to the third embodiment.

FIG. 26 is a flowchart of a main routine of the display apparatus according to the third embodiment. When the power supply button 28a of the operation panel 28 is turned ON, the CPU 54 is started, and the CPU 54 executes the operation shown in this main flowchart in accordance with the control program stored in the ROM 56.

That is, the CPU 54 first initializes each component of the display apparatus at the time of the start (step S1). In this initialization, for example, the data for bringing the LCD which is the light modulation device 16 into the black state is written into the memory for display 62, the LED 10 is turned off, or the RAM 58 is cleared.

Next, it is judged whether or not the operation of the operation panel 28 is in an adjustment mode, that is, whether or not the adjustment mode button 28e of the operation panel 28 has been pressed (step S2). That is, the adjustment mode button 28e functions as a mode switch section. Moreover, in the adjustment mode, a sub-routine of the "white balance adjustment mode" is executed as described later in detail (step S3). Moreover, when the mode is not the adjustment mode, the sub-routine of the "usual use mode" is executed as described later in detail (step S4). It is to be noted that at the time of the shipping of the display apparatus from a factory, the sub-routine of the "white balance adjustment mode" is executed, and the supply current of the LED 10 initially set in the usual use mode is recorded in the flash memory 68. At the time of power ON, surely after executing the sub-routine of the "white balance adjustment mode", the sub-routine of the "usual use mode" may also be executed.

Figure 27:
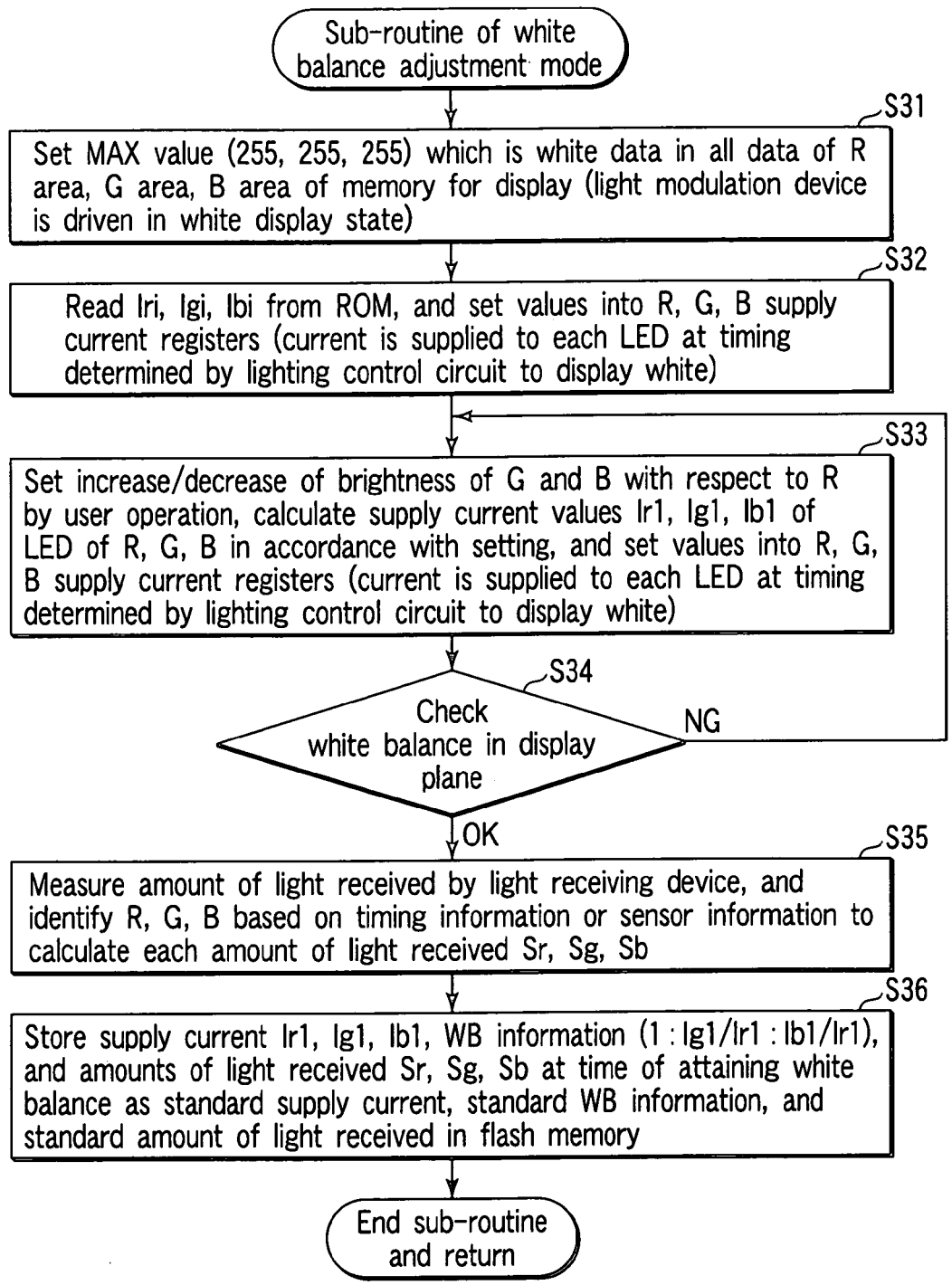
FIG. 27 is a flowchart of a sub-routine of a "white balance adjustment mode"

As shown in FIG. 27, in the sub-routine of the "white balance adjustment mode" of the step S3, first MAX value (255, 255, 255) which is white data (for eight-bit data) is set in all data of R area, G area, B area of the memory for display 62 (step S31). Accordingly, the light modulation device (LCD) 16 is driven in a state at the time of white display.

Thereafter, supply currents Iri, Igi, Ibi of the respective LEDs 10R, 10G, 10B are read from the ROM 56, and set into the R, G, B supply current registers of the LED lighting control circuit 66 (step S32). Accordingly, the current is supplied to the respective LEDs 10R, 10G, 10B at the timing determined by the LED lighting control circuit 66. At this time, since the light modulation device (LCD) 16 is driven in the state at the time of the white display, white with a deviating white balance is displayed on the display plane of the screen S.

Then, an increase/decrease of brightness of G and B with respect to R is set by user operation of the color adjustment buttons 28c of the operation panel 28, and the supply currents Ir1, Ig1, Ib1 of the LED of R, G, B are calculated in accordance with setting, and set into the R, G, B supply current registers of the LED lighting control circuit 66 (step S33). Accordingly, the currents are supplied to the respective LEDs 10R, 10G, 10B at the timing determined by the LED lighting control circuit 66 to renew the display. Subsequently, the white balance in the display plane of the screen S is checked (step S34). If the white balance is not attained yet, the flow returns to the step S33 to continue the adjustment. It is to be noted that the white balance in the display plane is checked using a measuring machine for exclusive use at the time of the shipping from the factory, or checked by a general user in accordance with user's judgment (choice).

Therefore, with OK as a result of the white balance check in the step S34, the adjustment mode button 28e is pressed to advance to step S35. The amount of light received is measured by the light receiving device 26, and R, G, B is identified based on emission timing or sensor position information as described above to calculate the amounts of light received Sr, Sg, Sb for each color (step S35). Moreover, the supply currents Ir1, Ig1, Ib1, white balance (WB) information (1:Ig1/Ir1:Ib1/Ir1), and the amounts of light received Sr, Sg, Sb at time of the attaining of the white balance are stored as standard supply currents, standard WB information, and standard amounts of light received in the flash memory 68 (step S36). Thereafter, the sub-routine is ended to return to the main routine.

Figure 28:
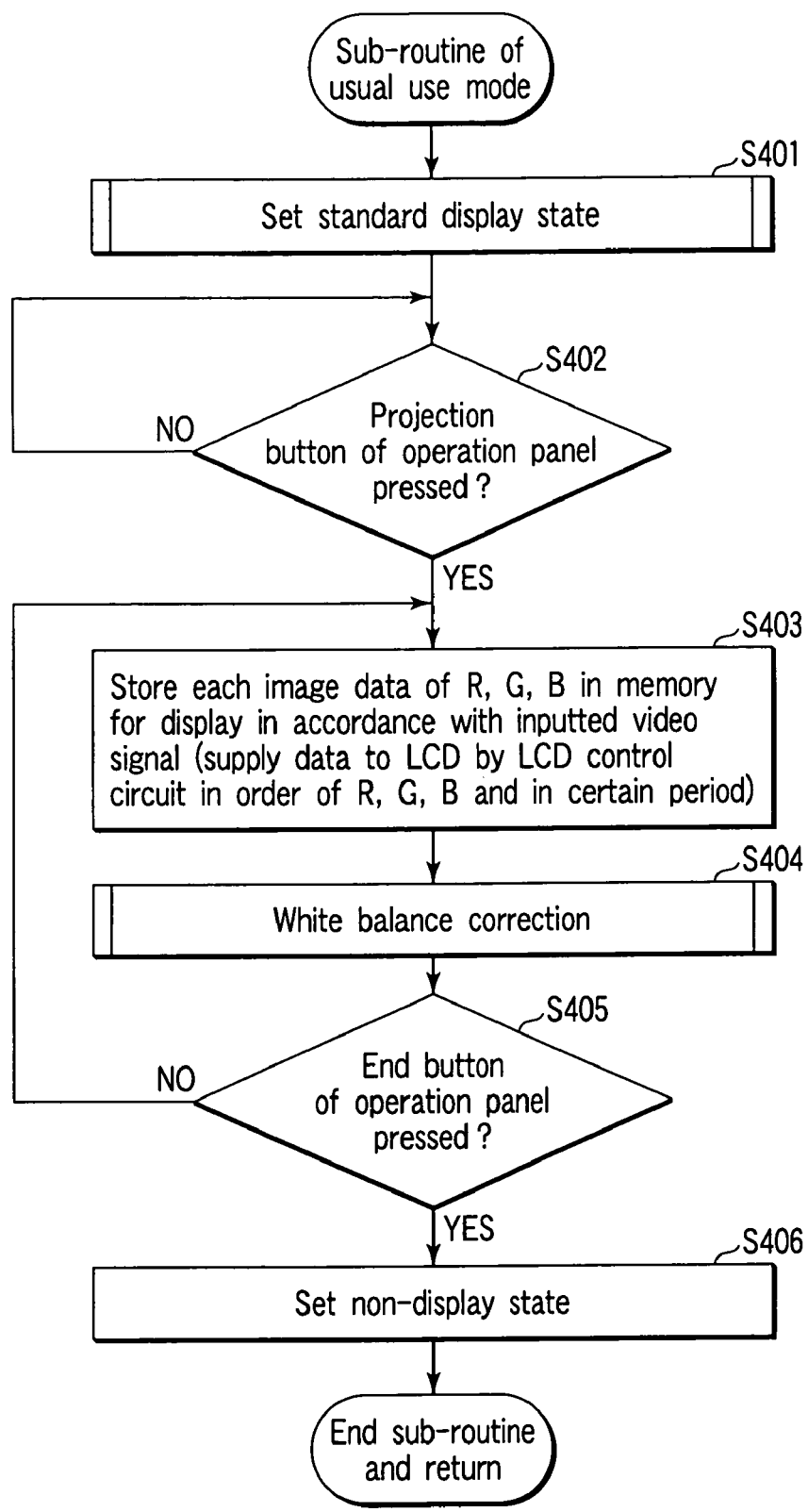
FIG. 28 is a flowchart of a sub-routine of a "usual use mode" in a case where calibration is performed constantly even at the time of start.

On the other hand, FIG. 28 is a flowchart of a sub-routine of the "usual use mode" of the step S4. This shows a case where the calibration is performed constantly including the start time.

Figure 29:
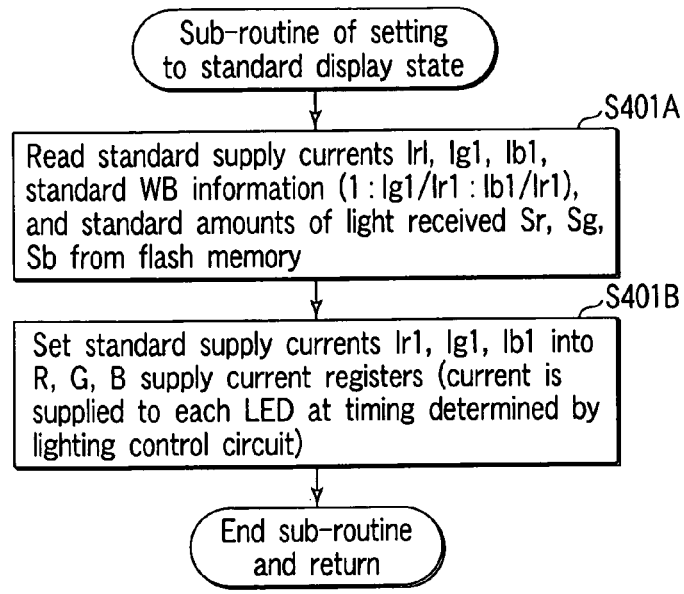
FIG. 29 is a flowchart of a sub-routine of "setting to standard display state"

In the sub-routine of the "usual use mode", first the sub-routine of the "setting to a standard display state" is carried out (step S401), and the LED lighting control circuit 66 is brought into the standard display state. That is, as shown in FIG. 29, in the sub-routine of the "setting to the standard display state", first the standard supply currents Ir1, Ig1, Ib1, the standard WB information (1:Ig1/Ir1:Ib1/Ir1), and the standard amounts of light received Sr, Sg, Sb stored in the sub-routine of the "white balance adjustment mode" are read from the flash memory 68 (step S401A). Moreover, the read standard supply currents Ir1, Ig1, Ib1 are set to the R, G, B supply current registers of the LED lighting control circuit 66 (step S401B). Accordingly, the set currents are supplied to the respective LEDs 10R, 10G, 10B at the timing determined by the LED lighting control circuit 66. Thereafter, the sub-routine is ended to return to the sub-routine of the "usual use mode".

When returning from the sub-routine of the "setting to the standard display state", it is next checked whether or not the button for instructing the projection (hereinafter abbreviated as projection button) of the projection/end button 28b of the operation panel 28 is pressed (step S402). The check is repeated until the button is pressed. After the projection button is pressed, the flow advances to the next step. Next, each image data of R, G, B is stored in the R area, G area, B area of the memory for display 62 in accordance with the inputted color video signal (step S403). The image data stored in the memory for display 62 is supplied to the LCD which is the light modulation device 16 by the LCD control circuit 64 in order of R, G, B and in a certain period, and projected/displayed on the screen S.

Figure 30:
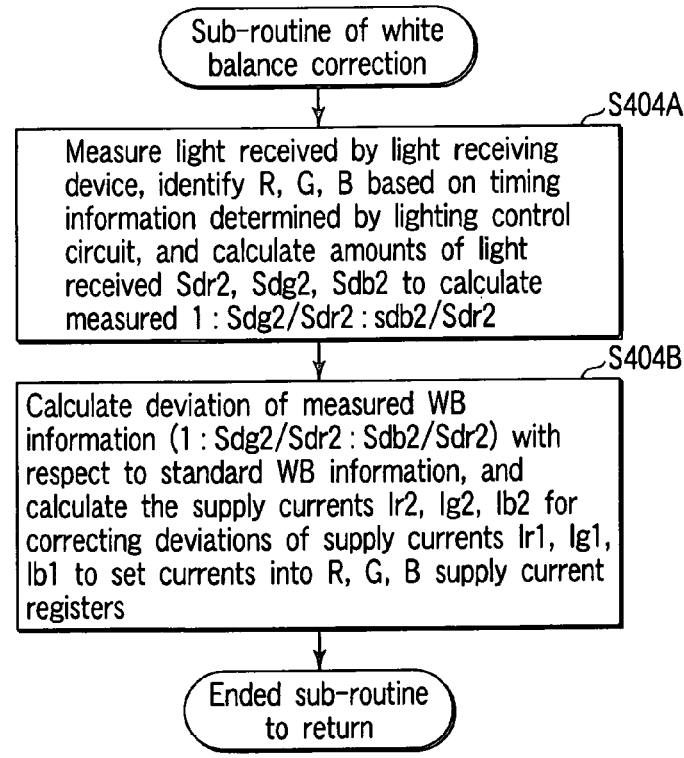
FIG. 30 is a flowchart of a sub-routine of "white balance correction"

Subsequently, the sub-routine of the "white balance correction" is carried out (step S404) Accordingly, the amount of light received is measured by the light receiving device 26, and the white balance correction is performed in accordance with the amount. That is, as shown in FIG. 30, in the sub-routine of the "white balance correction", first the amount of light received by the light receiving device 26 is measured, R, G, B is identified based on the timing information determined by the LED lighting control circuit 66, and amounts of light received Sdr2, Sdg2, Sdb2 are calculated to calculate measured WB information (1:Sdg2/Sdr2: Sdb2/Sdr2) (step S404A). Moreover, the deviation of the measured WB information (1:Sdg2/Sdr2:Sdb2/Sdr2) is calculated with respect to the standard WB information (1:Ig1/Ir1:Ib1/Ir1) read from the flash memory 68 in the sub-routine of the "setting to the standard display state". The supply currents Ir2, Ig2, Ib2 for correcting the deviations of the supply currents Ir1, Ig1, Ib1 are calculated to set the currents into the R, G, B supply current registers of the LED lighting control circuit 66 (step S404B). Thereafter, the sub-routine is ended to return to the sub-routine of the "usual use mode".

When returning from the sub-routine of the "white balance correction", that is, when the white balance is corrected, next it is judged whether or not the button for indicating the projection end (hereinafter abbreviated as end button) of the projection/end button 28b of the operation panel 28 is pressed (step S405). Moreover, when the end button is not pressed, the flow returns to the step S403. Accordingly, the re-display is carried out in a state in which the white balance is corrected. It is to be noted that, in actuality, when there is no change in the inputted color video signal, it is not necessary to store the data into the memory for display 62 in the step S403. The image data stored in the memory for display 62 may simply be supplied to the LCD which is the light modulation device 16 by the LCD control circuit 64 in the order of R, G, B and in a certain period.

Moreover, when the end button is judged to have been pressed in the step S405, in order to set a non-display state, "0" is set to the R, G, B supply current registers (step S406), and the sub-routine of the "usual use mode" is ended to return to the main routine. Needless to say, the flow may also be returned to the step S402 without ending the sub-routine.

Figure 31:
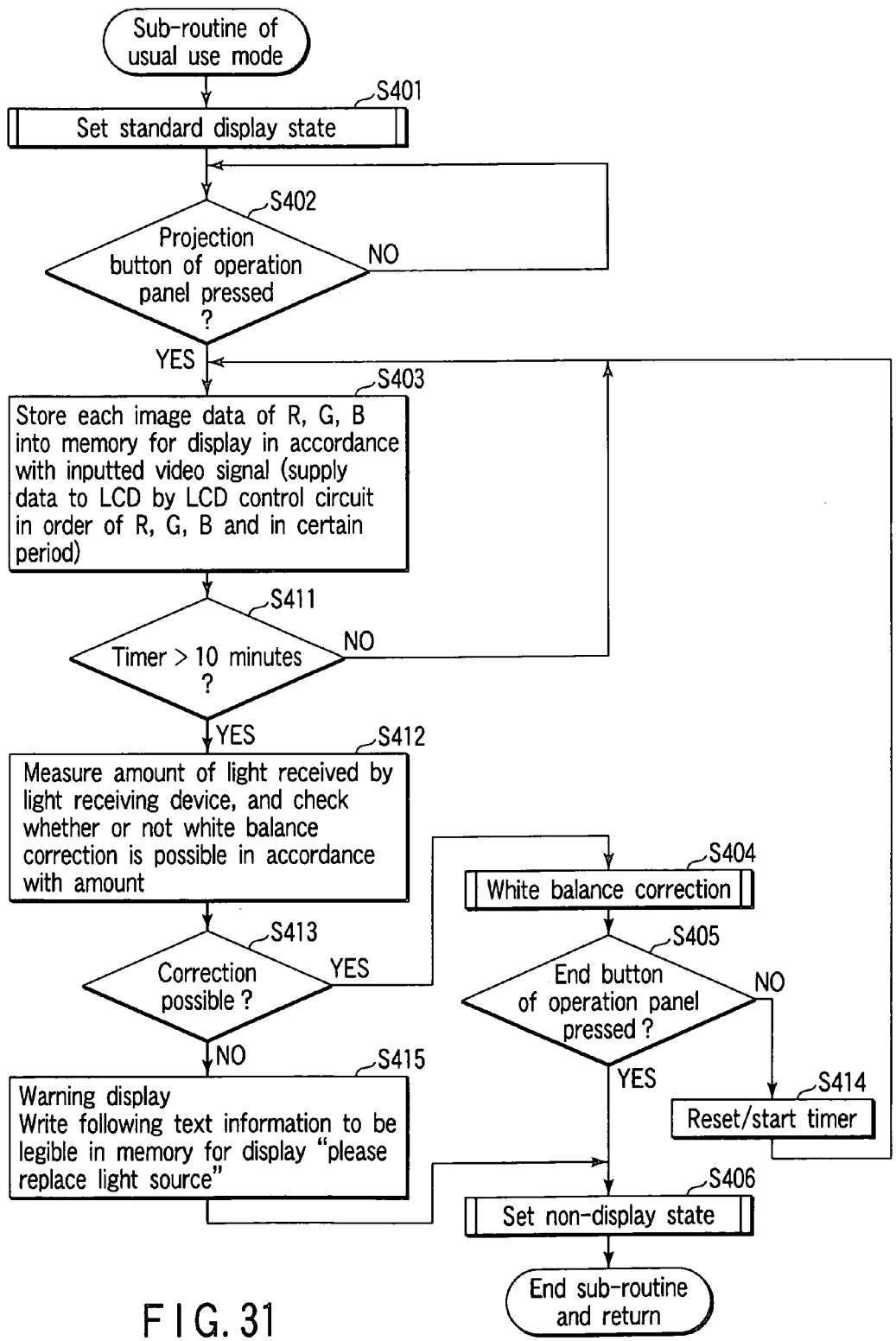
FIG. 31 is a flowchart of a sub-routine of the "usual use mode" in a case where warning is given for calibration every ten minutes and at a non-correctable time.

FIG. 31 is a flowchart showing a modification example of the sub-routine of the "usual use model" of the step S4. In this modification example, the calibration is carried out every ten minutes, that is, the TIMER 70 is used as a mode switch section, and a warning is given to the user at the time of the non-correctable time. It is to be noted that in this case, the TIMER 70 is assumed to be started in the initialization of the step S1 of the main routine.

That is, in the modification example, first the above-described sub-routine of the "setting to the standard display state" is executed (step S401) to set the LED lighting control circuit 66 to the standard display state. Moreover, here, the TIMER 70 is reset/started. Next, the pressing of the projection button of the operation panel 28 is waited for (step S402). After the projection button is pressed, each image data of R, G, B is stored in R area, G area, B area of the memory for display 62 in accordance with the inputted color video signal (step S403). The image data stored in this memory for display 62 is supplied to the LCD which is the light modulation device 16 by the LCD control circuit 64 in the order of R, G, B and in the certain period, and projected/displayed onto the screen S.

Subsequently, it is judged whether or not time counted by the TIMER 70 exceeds ten minutes (step S411). Here, when the time does not exceed ten minutes yet, the flow returns to the step S403. It is to be noted that when the flow returns to the step S403, and when there is not any change in the inputted color video signal in actual, it is not necessary to store the data into the memory for display 62. The image data stored in the memory for display 62 may simply be supplied to the LCD which is the light modulation device 16 by the LCD control circuit 64 in order of R, G, B and in the certain period.

On the other hand, when the time counted by the TIMER 70 is judged to exceed ten minutes in the step S411, the amount of light received is measured by the light receiving device 26, and it is checked whether or not the white balance can be corrected in accordance with the amount (step S412). In this check, the supply current into the LED 10 is adjusted, or it is judged whether or not the value has reached a limit value of the adjustment of the display data. The judgment is not limited to this, and it may be judged whether or not a set value that is not easily used has been reached.

Moreover, when the white balance is still correctable (step S413), the above-described sub-routine of the "white balance correction" is carried out (step S404). Accordingly, the amount of light received is measured by the light receiving device 26, and the white balance is corrected in accordance with the amount.

After the sub-routine of the "white balance correction" ends, that is, if the white balance is corrected, it is next judged whether or not the end button of the projection/end button 28b of the operation panel 28 has been pressed (step S405). Moreover, when the end button is not pressed, the TIMER 70 is reset/started. Accordingly, after starting counting another ten minutes (step S414), the flow returns to the step S403. The re-display is carried out in the state in which the white balance is corrected. It is to be noted that, in actuality, when there is no change in the inputted color video signal, it is not necessary to store the data into the memory for display 62 in the step S403. The image data stored in the memory for display 62 may simply be supplied to the LCD which is the light modulation device 16 by the LCD control circuit 64 in order of R, G, B and in the certain period.

Subsequently, when the button for instructing the projection end is judged to be pressed in the step S405, the non-display state is set in step S406, and the sub-routine of the "usual use model" is ended to return to the main routine.

Moreover, when it is judged to be impossible to correct the white balance as a result of the check in the step S412

(step S413), the warning is displayed for a predetermined time (step S415), the non-display state is set (step S406), and the sub-routine of the "usual use mode" is ended to return to the main routine. It is to be noted that the warning is projected/displayed on the screen S, for example, when text information such as "please replace light source" is written in the memory for display 62 in the readable manner. Needless to say, for the warning, a warning indicator or an LCD display may be disposed in the operation panel 28 to give the warning to the user, or a speaker may also be disposed to notify the warning by sound.

Figure 32:
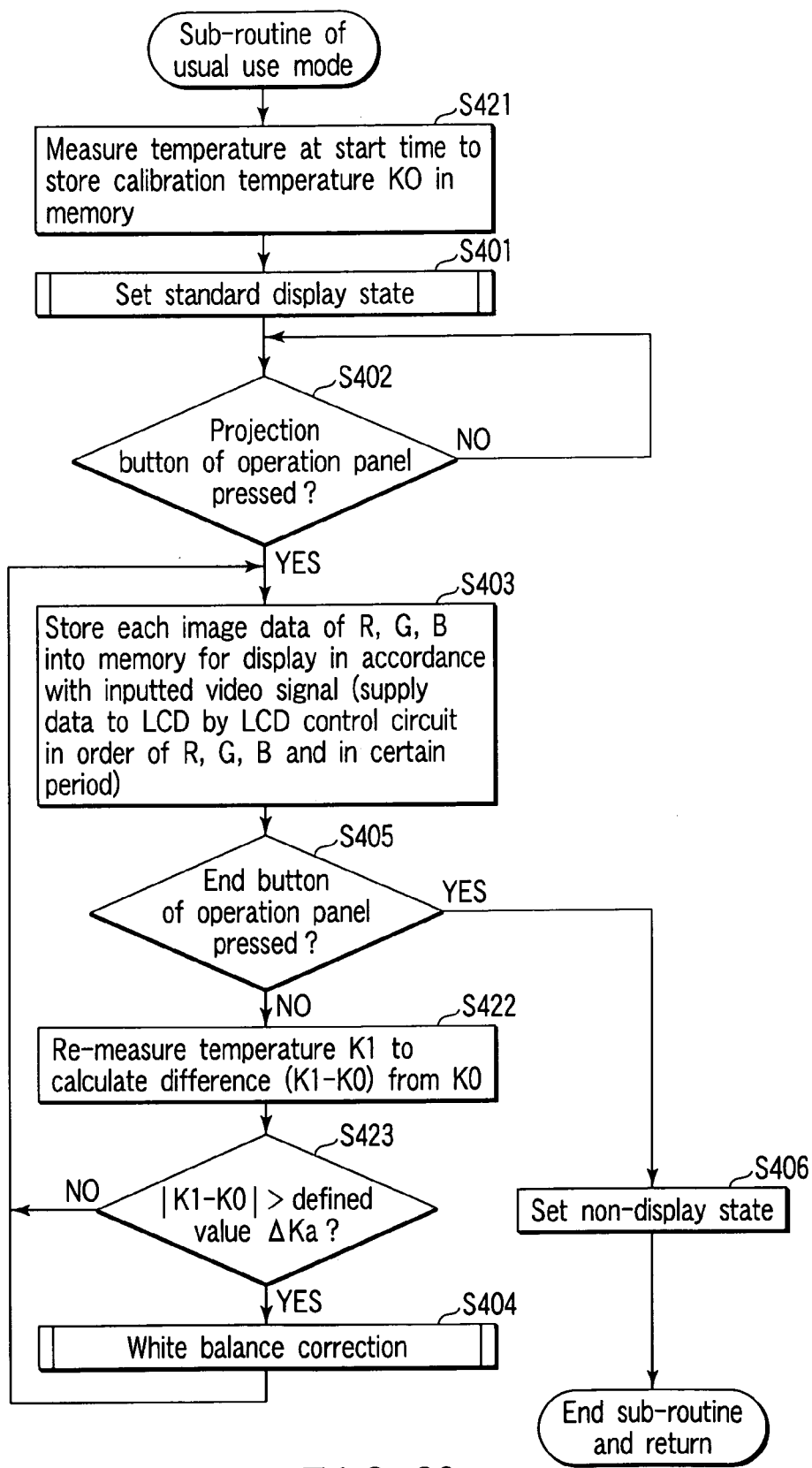
FIG. 32 is a flowchart of a sub-routine of the "usual use mode" in a case where the calibration is performed in response to a temperature change.

FIG. 32 is a flowchart showing another modification example of the sub-routine of the "usual use mode" of the step S4. In this modification example, the calibration is carried out in accordance with a temperature change, that is, the temperature sensors 50 is used as the mode switch section. In this modification example, first the temperature at the start time is measured by the temperature sensors 50, and stored as a calibration temperature K0 in the memory (RAM 58) (step S421).

Next, the above-described sub-routine of the "setting to the standard display state" is carried out (step S401), and the LED lighting control circuit 66 is set to the standard display state. After ending the sub-routine of the "setting to the standard display state", the pressing of the projection button of the operation panel 28 is waited for (step S402). Thereafter, each image data of R, G, B is stored in the R area, G area, B area of the memory for display 62 in accordance with the inputted color video signal (step S403). The image data stored in this memory for display 62 is supplied to the LCD which is the light modulation device 16 by the LCD control circuit 64 in order of R, G, B and in the certain period, and projected/displayed onto the screen S. Thereafter, it is judged whether or not the end button of the projection/end button 28b of the operation panel 28 has been pressed (step S405).

Here, when the end button is not pressed, a temperature K1 is re-measured by the temperature sensors 50 to calculate a difference between the re-measured temperature K1 and the calibration temperature K0 stored in the RAM 58, that is, K1−K0 (step S422). Moreover, it is judged whether or not the absolute value of the calculation result, that is, |K1−K0| exceeds a defined value ΔKa (step S423). At this time, when |K1−K0| is not more than the defined value ΔKa, the flow returns to the step S403. It is to be noted that when the flow returns to the step S403, and when there is no change in the inputted color video signal in actual, it is not necessary to store the data into the memory for display 62. The image data stored in the memory for display 62 may simply be supplied to the LCD which is the light modulation device 16 by the LCD control circuit 64 in order of R, G, B and in the certain period.

On the other hand, when |K1−K0| is judged to exceed the defined value ΔKa in the step S423, the sub-routine of the "white balance correction" is carried out (step S404). Accordingly, the amount of light received is measured by the light receiving device 26, and the white balance is corrected in accordance with the amount. Moreover, after the sub-routine of the "white balance correction" ends, that is, when the white balance is corrected, the flow returns to the step S403. Accordingly, the re-display is carried out in the state in which the white balance is corrected. It is to be noted that, in actuality, when there is no change in the inputted color video signal, it is not necessary to store the data into the memory for display 62 in the step S403. The image data stored in the memory for display 62 may simply be supplied to the LCD which is the light modulation device 16 by the LCD control circuit 64 in order of R, G, B and in the certain period.

Moreover, when the end button is judged to be pressed in the step S405, the non-display state is set (step S406), and the sub-routine of the "usual use mode" is ended to return to the main routine.

Figure 33:
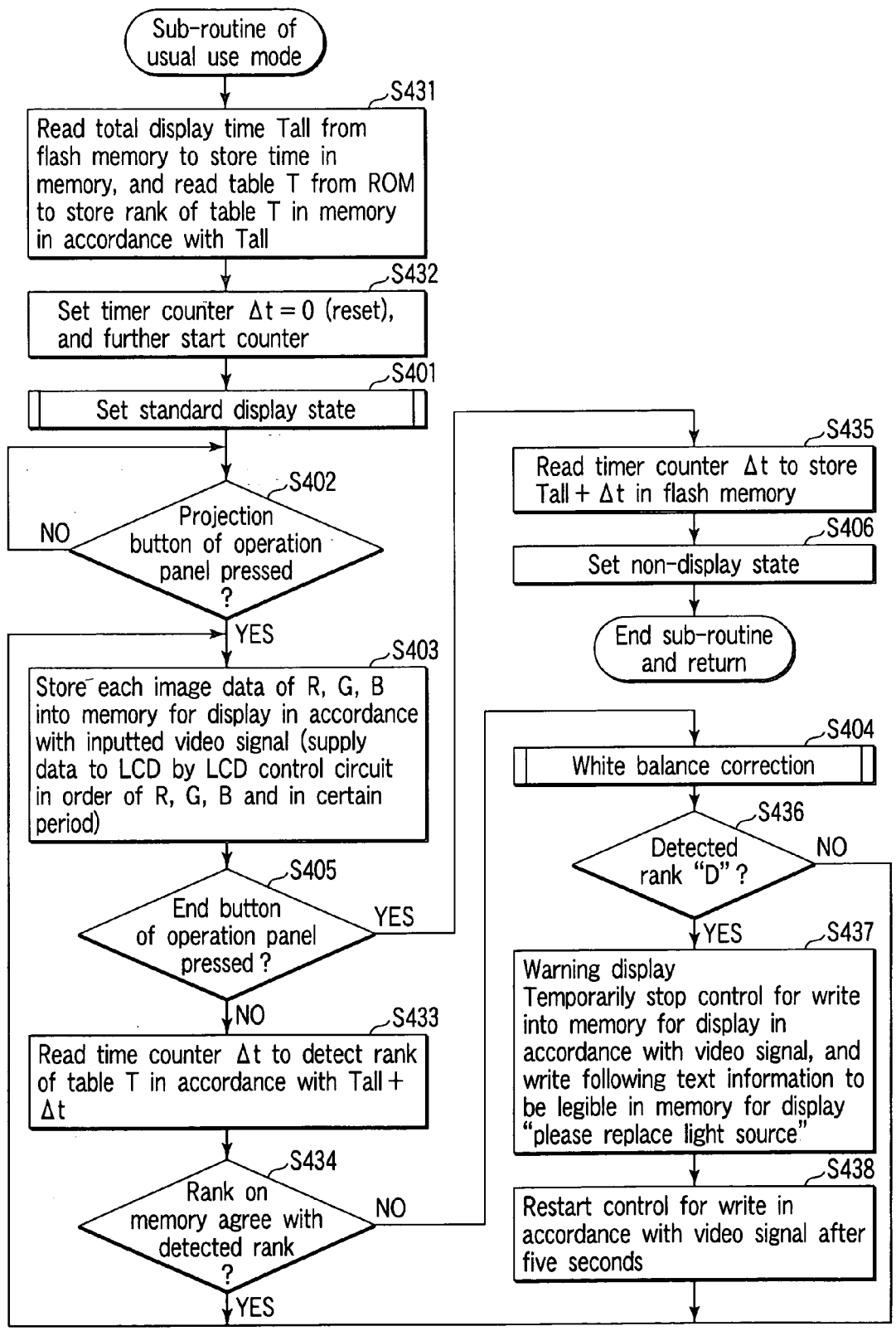
FIG. 33 is a flowchart of a sub-routine of the "usual use mode" in a case where the calibration is performed in accordance with a total display time.
Figures 34, 35:
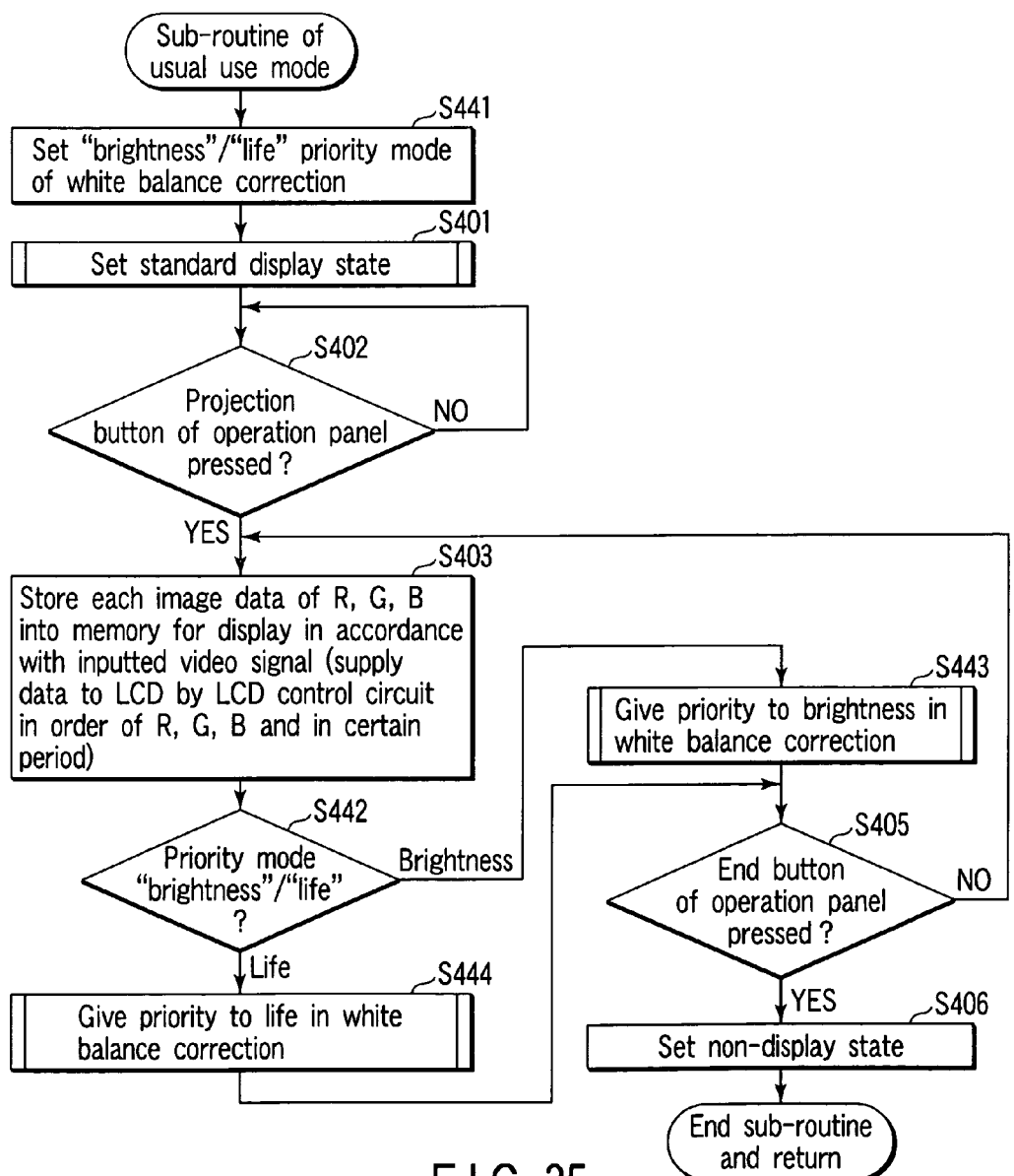
FIG. 34 is a diagram showing a content of a table stored in ROM.
FIG. 35 is a flowchart of a sub-routine of the "usual use mode" in a case where the calibration is performed in accordance with a priority mode of brightness/life in the white balance correction.

FIG. 33 is a flowchart showing another modification example of the sub-routine of the "usual use mode" of the step S4. In this modification example, the calibration is carried out in accordance with a total display time. It is to be noted that in this case it is assumed that total display time Tall=0 is written in the flash memory 68, and table T shown in FIG. 34 is stored in the ROM 56 at the time of the shipping of the display apparatus from the factory.

That is, in this modification example, first the total display time Tall is read from the flash memory 68 and stored in the memory (RAM 58). Moreover, the table T is read from the ROM 56, and a rank of the table T is stored in the memory (RAM 58) in accordance with the total display time Tall (step S431). Moreover, after once resetting the TIMER 70, that is, timer counter Δt, the timer counter is started (step S432).

Next, the above-described sub-routine of the "setting to the standard display state" is carried out (step S401), and the LED lighting control circuit 66 is set to the standard display state. After ending the sub-routine of the "setting to the standard display state", the pressing of the projection button of the operation panel 28 is waited for (step S402), and each image data of R, G, B is stored in the R area, G area, B area of the memory for display 62 in accordance with the inputted color video signal (step S403). The image data stored in this memory for display 62 is supplied to the LCD which is the light modulation device 16 by the LCD control circuit 64 in order of R, G, B and in the certain period, and projected/displayed onto the screen S.

Thereafter, it is judged whether or not the end button of the projection/end button 28b of the operation panel 28 has been pressed (step S405). Here, when the end button is not pressed, the timer counter Δt is read, a sum (Tall+Δt) of the value of the read timer counter Δt and the value of the total display time Tall stored in the memory in the step S431 at the time of the start of the sub-routine of the "usual use mode" is calculated, and the rank corresponding to the calculated time is detected from the table T stored in the memory (step S433). Moreover, it is judged whether or not this detected rank agrees with the rank stored in the memory in the step S431 at the time of the start of the sub-routine of the "usual use mode" (step S434). Here, when the ranks agree with each other, the flow returns to the step S403. It is to be noted that when the flow returns to the step S403 in this manner, and when there is no change in the inputted color video signal in actual, it is not necessary to store the data into the memory for display 62. The image data stored in the memory for display 62 may simply be supplied to the LCD which is the light modulation device 16 by the LCD control circuit 64 in order of R, G, B and in the certain period.

Moreover, when the end button is judged to be pressed in the step S405, the timer counter Δt is read, the sum (Tall+Δt) of the value of the read timer counter Δt and the value of the total display time Tall stored in the memory in the step S431 at the time of the start of the sub-routine of the "usual use mode" is calculated, and the obtained time is stored as a new total display time Tall into the flash memory 68 (step S435). Thereafter, the non-display state is set (step S406), the sub-routine of the "usual use mode" is ended, and the flow returns to the main routine. Therefore, at the time of the next execution of the "usual use mode", the total display time Tall read from the flash memory 68 in the step S431 and stored in the memory indicates the value of time updated in the step S435.

On the other hand, when the detected rank is judged not to agree with the rank stored in the memory in the step S434, the sub-routine of the above-described "white balance correction" is carried out (step S404). Accordingly, the amount of light received is measured by the light receiving device 26, and the white balance is corrected in accordance with the amount. After the sub-routine of the "white balance correction" ends, that is, when the white balance is corrected, it is next judged whether or not the detected rank is "D" (step S436). Here, if not, the flow returns to the step S403. It is to be noted that even when the flow returns to the step S403, and when there is no change in the inputted color video signal in actual, it is not necessary to store the data into the memory for display 62. The image data stored in the memory for display 62 may simply be supplied to the LCD which is the light modulation device 16 by the LCD control circuit 64 in order of R, G, B and in the certain period.

On the other hand, when the detected rank is "D" (step S436), the warning is displayed (step S437). In this warning display, the control for the write into the memory for display 62 in accordance with the color video signal is once stopped, and the text information such as "please replace light source" is written in a readable manner in the memory for display 62. Accordingly, the warning sentence is projected/displayed onto the screen S. Moreover, after five seconds, the control for the write in accordance with the color video signal is again started (step S438), and the flow returns to the step S403. It is to be noted that for the warning, needless to say, the warning indicator or the LCD display may be disposed in the operation panel 28 to give the warning to the user, or the speaker may also be disposed to notify the warning by sound.

FIG. 35 is a flowchart of still another modification example of the sub-routine of the "usual use model" of the step S4. In this modification example, the calibration is carried out in accordance with a priority mode of brightness/life of the white balance correction. That is, in this modification example, first either a "brightness" priority mode or a "life" priority mode of the white balance correction is set in accordance with an operation state of the automatic calibration mode buttons 28f of the operation panel 28 (step S441). Moreover, the sub-routine of the "setting to the standard display state" is executed (step S401), and the LED lighting control circuit 66 is set to the standard display state. Next, the pressing of the projection button of the operation panel is waited for (step S402), and each image data of R, G, B is stored in the R area, G area, B area of the memory for display 62 in accordance with the inputted color video signal (step S403). The image data stored in this memory for display 62 is supplied to the LCD which is the light modulation device 16 by the LCD control circuit 64 in order of R, G, B and in the certain period, and projected/displayed onto the screen S.

Thereafter, it is judged whether or not the present priority mode is the "brightness" priority mode or the "life" priority mode (step S442). Here, with the "brightness" priority mode, the sub-routine of the "white balance correction giving priority to the brightness" is carried out (step S443). This sub-routine of the "white balance correction giving priority to the brightness" is similar to that of the "white balance correction" except that a value for increasing the supply current is calculated in calculating the supply currents Ir2, Ig2, Ib2 to correct the deviation in the step S404B in the above-described sub-routine of the "white balance correction". That is, as a result of the white balance correction, the LED 10 is controlled to increase the supply current in a state in which the white balance is attained with the deterioration of the emission efficiency of the LED at the time of the shipping from the factory. That is, the amount of light emitted by another LED is adjusted to that by a bright LED to attain the white balance, and accordingly the brightness of the display is maintained.

On the other hand, with the "life" priority mode (step S442), the sub-routine of the "white balance correction giving priority to the life" is carried out (step S444). This sub-routine of the "white balance correction giving priority to the life" is similar to that of the "white balance correction" except that a value for decreasing the supply current is calculated in calculating the supply currents Ir2, Ig2, Ib2 to correct the deviation in the step S404B in the above-described sub-routine of the "white balance correction". That is, as a result of the white balance correction, the LED 10 is controlled to reduce the supply current in a state in which the white balance is attained with the deterioration of the emission efficiency of the LED at the time of the shipping from the factory. That is, the amount of light emitted by another LED is adjusted to that by a dark LED to attain the white balance, and accordingly the life of the LED is lengthened.

Moreover, when the flow returns from the sub-routine of the "white balance correction giving priority to the brightness" or the "white balance correction giving priority to the life", that is, when the white balance is corrected, it is next judged whether or not the end button of the projection/end button 28b of the operation panel 28 has been pressed (step S405). Subsequently, when the end button is not pressed, the flow returns to the step S403. Accordingly, the re-display is carried out in the state in which the white balance is corrected. It is to be noted that, in actuality, when there is no change in the inputted color video signal, it is not necessary to store the data into the memory for display 62 in the step S403. The image data stored in the memory for display 62 may simply be supplied to the LCD which is the light modulation device 16 by the LCD control circuit 64 in order of R, G, B and in the certain period. Moreover, when the end button is judged to be pressed in the step S405, the non-display state is set (step S406), and the sub-routine of the "usual use mode" is ended to return to the main routine.

Next, a fourth embodiment of the present invention will be described. In the present embodiment, a light source device in a replaceable mode is incorporated in the display apparatus. That is, as shown in FIG. 36, for a light source device 72 according to the present embodiment, a substrate on which each LED 10 is mounted is constituted integrally with the LED substrate 48, the temperature sensors 50 are disposed on the surface (back surface) of the LED substrate 48 opposite to the LED mounting surface, and further the flash memory 68 is mounted on the back surface. In this constitution, these LED 10, LED substrate 48, temperature sensors 50, and flash memory 68 are integrally replaceable.

That is, this device is replaced by the unit of the LED substrate 48 in order to easily replace the device with the deterioration or failure of the LED 10 which is the light source. Moreover, for the LED substrate 48 which is a replacement component, in addition to the LEDs 10 of R, G, B, the flash memory 68 is mounted as a recording medium in which the calibration information on each LED 10 of the LED substrate 48 as the replacement component is recorded on the LED substrate 48, so that the substrate can quickly be used without adjusting the white balance during the illuminating with the respective LEDs 10 of R, G, B. That is, the respective LEDs 10 of R, G, B and the flash memory 68 in which the calibration information is recorded are mounted on the LED substrate 48. When the whole LED substrate 48 is replaced, the display can quickly be performed with the attained color balance without calibrating the substrate anew. It is to be noted that a wiring for the LED substrate 48 may preferably be easily detachable via a connector, and the like.

Moreover, the light source device 72 which is the replacement component may further include the taper rods 36, and may further be constituted to include the light receiving device 26.

It is to be noted that the recording medium in which the calibration information is recorded is not limited to the flash memory 68, and, for example, and a label may also be used. In the label, the calibration information is recorded in codes such as a bar code from which the information is optically readable, and a mode may also be used in which the label is attached to the LED substrate 48. Alternatively, when the code is directly printed on the LED substrate 48, the LED substrate 48 itself can be used as the recording medium. Needless to say, in this case, the display apparatus needs to include a read mechanism of the code.

Figure 37:
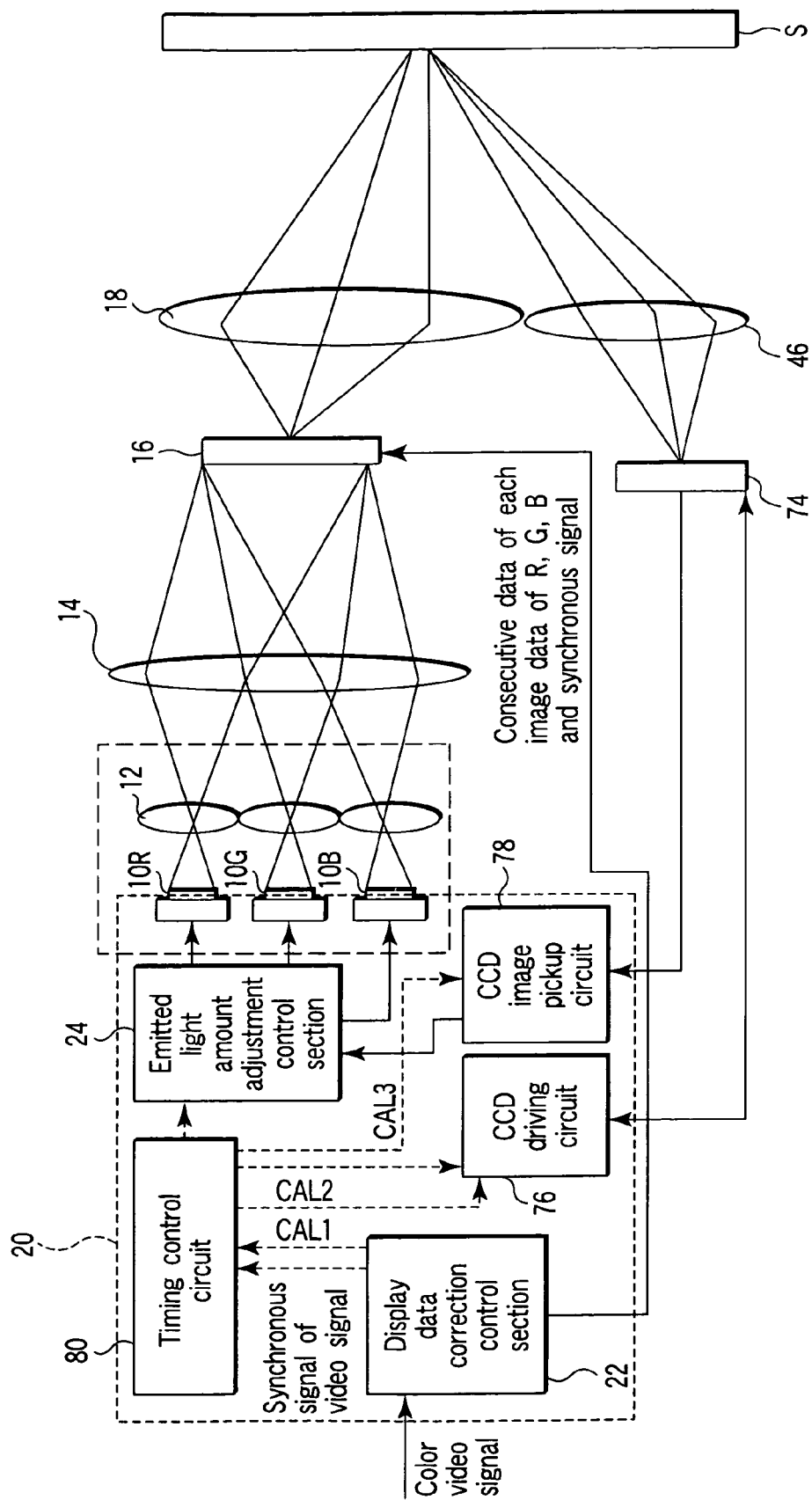
FIG. 37 is a functional constitution diagram showing a constitution of the display apparatus according to a fifth embodiment of the present invention.

Next, a fifth embodiment of the present invention will be described with reference to FIG. 37. In the fifth embodiment, a monochromatic CCD (image pickup device) 74 is used in which a plurality of light receiving devices are arranged in matrix. That is, the display plane is photographed by the CCD 74 via the image pickup lens 46 which is an optical member capable of focusing the light of a display region of the screen S surface which is the display plane. Moreover, the color balance adjustment control section 20 takes in the image pickup data in synchronization with the timing of successive display of R, G, B to identify the emission of R, G, B and the light of each color modulated by the light modulation device 16 is detected.

For this, in the display apparatus according to the fifth embodiment, in addition to the above-described display data correction control section 22 and emitted light amount adjustment control section 24, the color balance adjustment control section 20 includes a CCD driving circuit 76 for driving the CCD 74, a CCD image pickup circuit 78 for taking in the image pickup data from the CCD 74, and a timing control circuit 80 for controlling the operation timings of the CCD driving circuit 76, CCD image pickup circuit 78, and emitted light amount adjustment control section 24.

Here, in a switch timing of the video signal, the display data correction control section 22 detects the change of the image data in the color video signal, and outputs a calibration start signal CAL1 which is a predetermined calibration start signal to a timing control circuit 80. In response to the calibration start signal CAL1, the timing control circuit 80 outputs a signal CAL2 to the CCD driving circuit 76, and outputs a signal CAL3 to the CCD image pickup circuit 78. In this case, the display data correction control section 22 supplies white image data for one frame to the light modulation device 16 so that a white image is displayed on the screen S. Therefore, the display image in the screen display plane is picked up by the CCD 74 in synchronization with the display of the white image data.

This will be described with reference to the timing chart of FIG. 38 in more detail. That is, when the display data correction control section 22 detects that image 1 does not agree with image 2 in the color video signal, the signal CAL1 is outputted to the timing control circuit 80. Moreover, the image data optically modulated by the light modulation device 16 indicates "255" (with the light modulation device for the modulation based on the image data of eight bits) over three fields of R, G, B in all pixels. Accordingly, a maximum light amount of R, G, B by each field is projected onto the screen S display plane. The emitted light amount adjustment control section 24 takes in the result of the pickup of the projected image by the CCD 74 in response to a color CCD data acquisition timing signal obtained by delaying a lighting control signal of each field of R, G, B by one field. Moreover, a total sum Sr, Sg, Sb of all the pixels of the CCD output is calculated, and in accordance with the calculation result, the supply current is controlled to be supplied to the respective LEDs 10R, 10G, 10B of R, G, B in such a manner that the display is possible with the attained white balance on the screen S display plane.

Needless to say, instead of controlling the supply current of the LED 10, the output of the CCD image pickup circuit 78 is supplied to the display data correction control section 22, and the image data to be supplied to the light modulation device 16 may also be adjusted.

Figure 38:
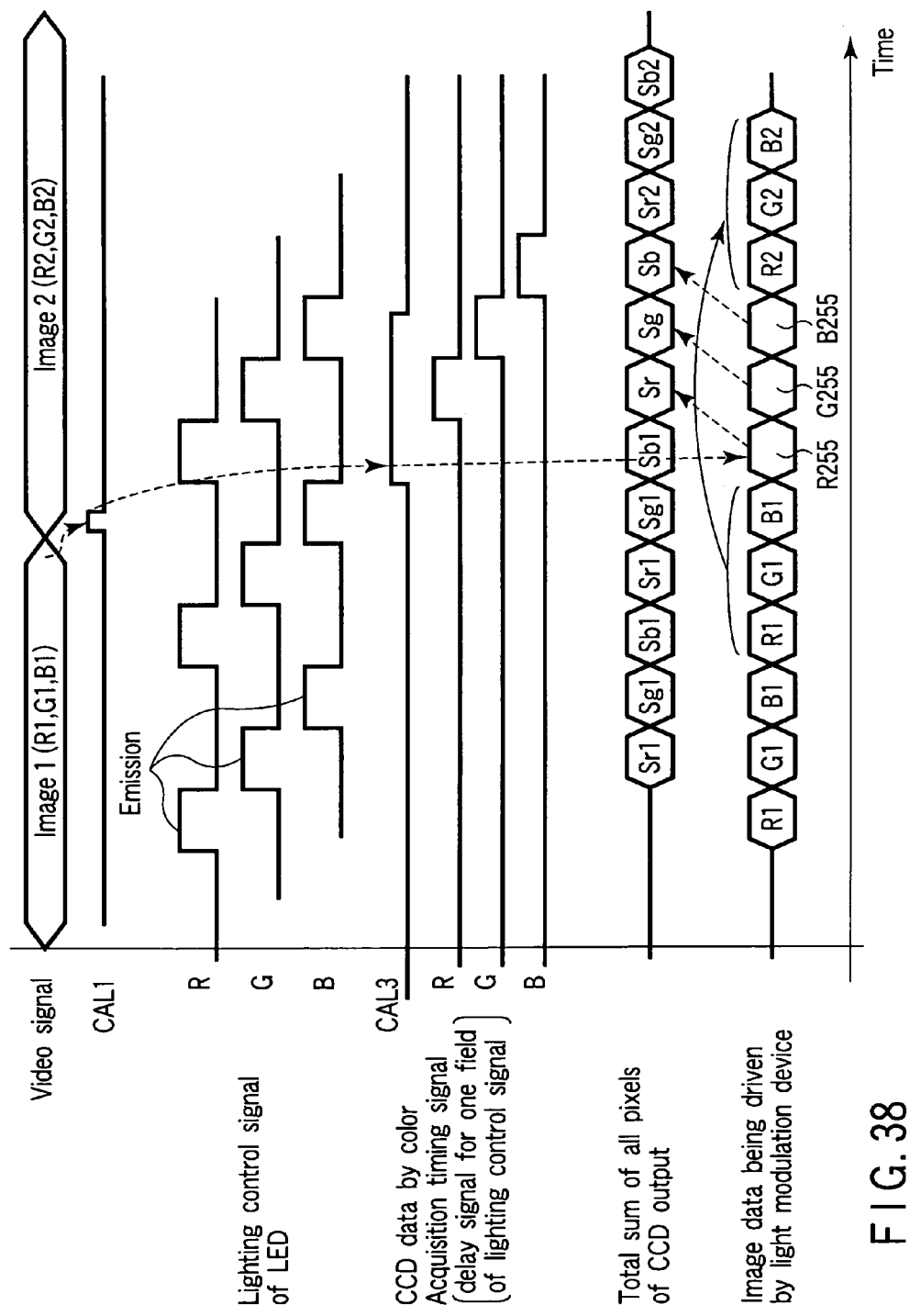
FIG. 38 is a timing chart of the display apparatus according to the fifth embodiment.

Moreover, in the timing chart of FIG. 38, the white image is inserted in the change of the image in the color video signal, and the display image on the screen S display plane is picked up from the white image by the CCD 74. As the modification example, without inserting the white image, the image is displayed on the screen S display plane in response to the inputted color video signal, while the displayed white pixels (255, 255, 255) included in the color video signal are detected. The amount of light received on the picked-up image of the picked-up position on the screen S display plane corresponding to the displayed white pixels is detected, and the color balance correction control is performed in the emitted light amount adjustment control section 24 or the display data correction control section 22 in accordance with the amount of light received. Alternatively, instead of inserting the white image over the whole screen S display plane as described above, a predetermined position on the display plane, for example, a right lower end part is converted to the white image, and displayed. Accordingly, without impairing basic device, the image is displayed, and the partially displayed white image is detected so that the color balance may also be corrected and controlled.

Figure 39:
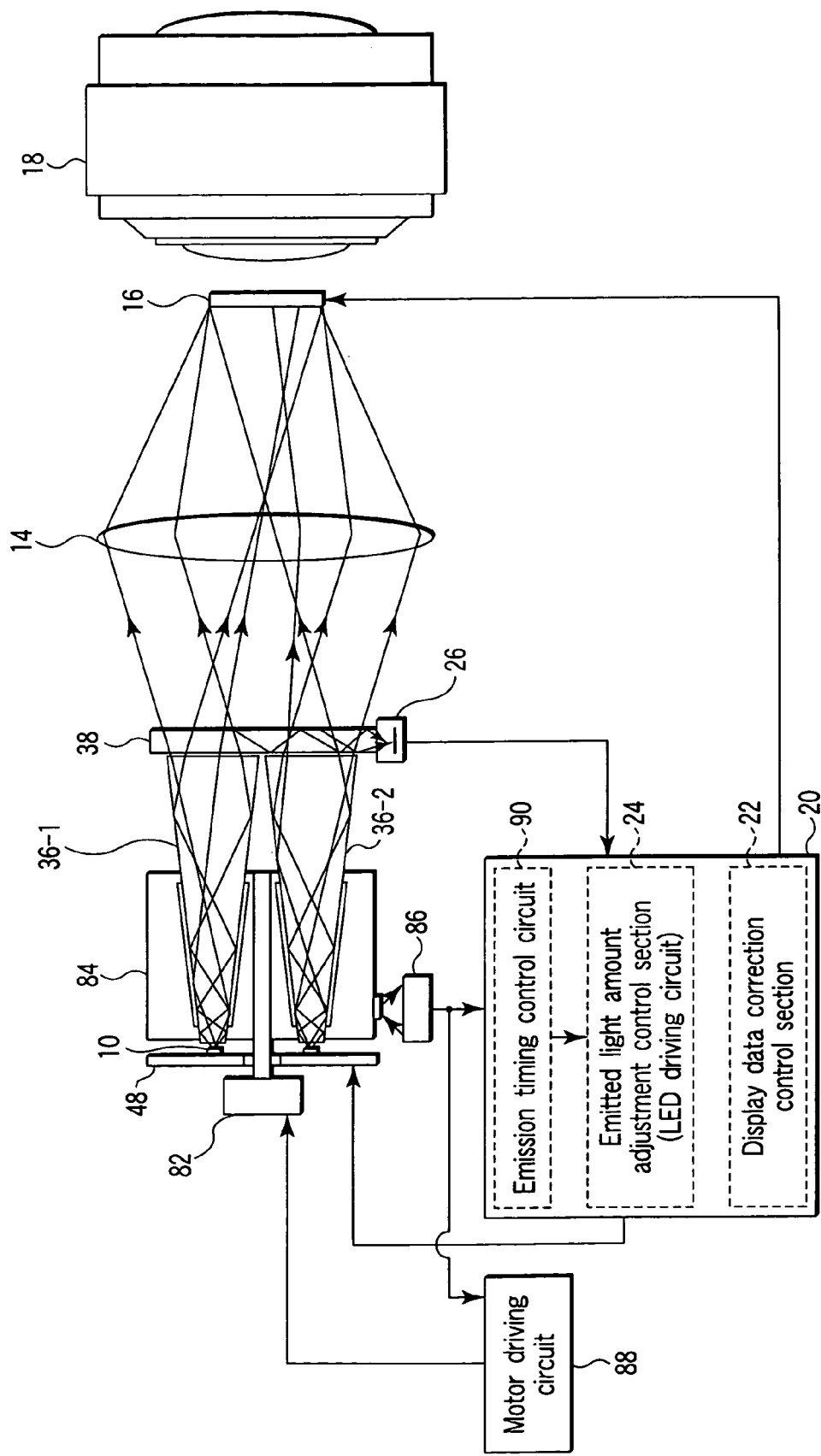
FIG. 39 is a functional constitution diagram showing a constitution of the display apparatus according to a sixth embodiment of the present invention.
Figure 40:
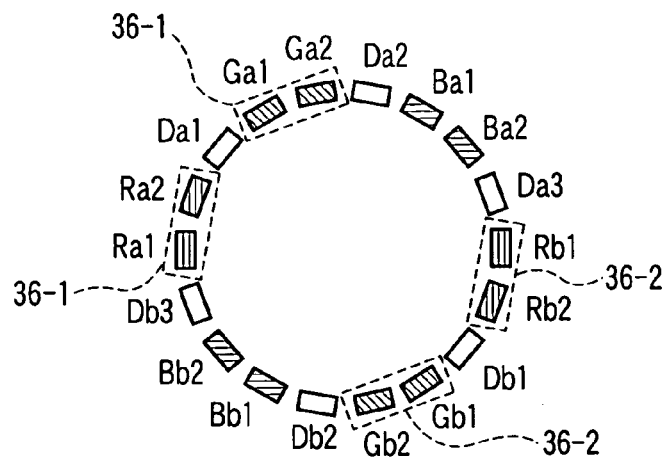
FIG. 40 is a diagram showing an arrangement of LEDs on an LED substrate of the display apparatus according to the sixth embodiment.

Next, a sixth embodiment of the present invention will be described. As shown in FIG. 39, in the display apparatus according to the sixth embodiment, an illuminating unit is used in which a plurality of LEDs 10 of the respective colors of R, G, B are disposed on the circumference of the disc-shaped LED substrate 48 and two optical members, that is, taper rods 36-1, 36-2 disposed opposite to these LEDs 10 are moved with respect to the LEDs 10 at a predetermined speed by a motor 82. That is, for the LEDs 10, as shown in FIG. 40, two LEDs of each color are arranged in one set, and the R-LEDs (Ra1, Ra2, Rb1, Rb2) 10R, the G-LEDs (Ga1, Ga2, Gb1, Gb2) 10G, and the B-LEDs (Ba1, Ba2, Bb1, Bb2) 10B are arranged via dummy LEDs (Da1 to Da3, Db1 to Db3) held between the sets so that the respective sets are disposed opposite to each other. It is to be noted that in FIG. 40, the difference in the emission color between the LEDs 10 is represented by different hatching. Therefore, in this figure, a hatched portion does not show any section.

A rod holder 84 constituting a rotatable holder to which two taper rods 36-1, 36-2 are attached is rotated by the motor 82, and the LEDs 10 are successively lit with the rotation. That is, at a time T1 when the position of the taper rod 36-1 (shown by a broken line in FIG. 40) reaches a position disposed opposite to the R-LEDs (Ra1, Ra2) 10R by the rotation of the rod holder 84, the other taper rod 36-2 is positioned opposite to the R-LEDs (Rb1, Rb2) 10R on the opposite side (shown by the broken line in FIG. 40). At this time, these R-LEDs (Ra1, Ra2, Rb1, Rb2) 10R are lit. Moreover, the rod holder 84 is further rotated by the motor 82 to dispose the taper rods 36-1, 36-2 opposite to the G-LEDs (Ga1, Ga2, Gb1, Gb2) 10G (shown by a one-dot chain line in FIG. 40) (time T2), and then the G-LEDs (Ga1, Ga2, Gb1, Gb2) 10G are lit.

The light emitted from these taper rods 36-1, 36-2 passes through the light guide plate 38, and is incident upon the superposition lens 14 to illuminate the display device which is the light modulation device 16. Moreover, the light emitted from the light modulation device 16 is projected onto the screen S by the projection lens 18. It is to be noted that as described above in the embodiment, the optical path of a part of the outgoing light from the taper rods 36 is bent by the cutout 40 disposed in the light guide plate 38, the light is guided by the light receiving device 26 which is a light amount monitor, and the light amount is detected by the light receiving device 26.

Furthermore, a rotation sensor 86 for detecting the rotation position of the rod holder 84 is disposed in the vicinity of the side surface of the rod holder 84. For example, a photo reflector is used as the rotation sensor 86, and the light reflected by the reflective plate attached to the side surface of the rod holder 84 can be detected to detect one rotation of the rod holder 84. A rotation position detection signal by the rotation sensor 86 is inputted in a motor driving circuit 88 and an emission timing control circuit 90 of the color balance adjustment control section 20. Here, the motor driving circuit 88 drives the motor 82, and constitutes a moving section to rotatably drive the taper rods 36-1, 36-2 together with the motor 82. That is, when the operation start signal is inputted in accordance with the button operation of the operation panel 28 by the user, the motor driving circuit 88 starts the rotation of the motor 82, and drives/controls the motor 82 so that the motor rotates at a certain speed in accordance with a rotation position detection result of the rod holder 84 by the rotation sensor 86.

Moreover, the emission timing control circuit 90 constitutes a light selection control section for controlling the emission timings of the plurality of LEDs 10 together with the light receiving device 26, the rotation sensor 86, and the emitted light amount adjustment control section 24 constituting the LED driving circuit into which the light amount detection result by the light receiving device 26 is inputted. That is, the emission timing control circuit 90 produces a timing signal based on the rotation position detection of the rod holder 84 by the rotation sensor 86, and inputs the signal into the emitted light amount adjustment control section 24. The emitted light amount adjustment control section 24 functions as a lighting section for lighting and driving the LED 10. That is, when each LED 10 mounted on the LED substrate 48 is driven in accordance with the timing signal inputted from the emission timing control circuit 90, the LED 10 is controlled and successively lit in incidence plane positions of the taper rods 36-1, 36-2.

Figure 41:
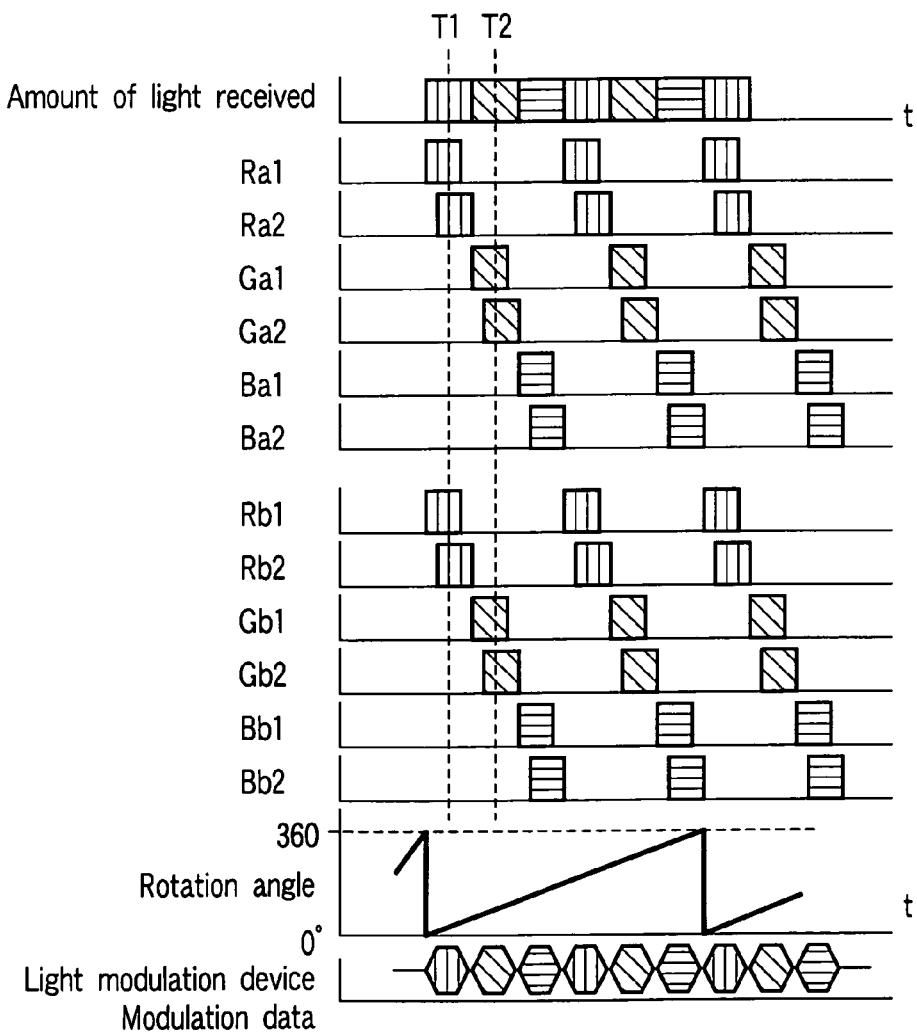
FIG. 41 is a timing chart of the display apparatus according to the sixth embodiment at the time of display.

It is to be noted that the supply current of the LED 10 at this time is adjusted in accordance with the amount of light received by the light receiving device 26. That is, as shown in FIG. 41, two LEDs 10 are controlled to simultaneously emit the light with respect to one taper rod 36. In this case, the LEDs aligned in synchronization with the rotation are lit while the phase is shifted by the half of one pulse. Accordingly, illuminating unevenness is suppressed. The LEDs 10 of the same color are constituted to emit the light with respect to two taper rods 36-1, 36-2. Therefore, four LEDs are simultaneously lit at the time T1, T2. In this case, since the light from the plurality of LEDs 10 is successively switched and is incident upon the light guide plate 38, the light is also successively incident upon the light receiving device 26. Therefore, the amount of light received by each LED that simultaneously emits the light can be measured. Accordingly, the total light amount of R, G, B in one frame can be calculated, and the calculation result is used to adjust and control the color balance by the color balance adjustment control section 20.

In this manner, the plurality of LEDs 10 are successively switched to emit the pulse light, and a positional relation with the taper rods 36-1, 36-2 for taking in the emitted light is selected and shifted with the switch of the emission of the LED 10. In this manner, in the process of one rotation of each of the taper rods 36-1, 36-2, the color of the emitted light changes in order of red (R), green (G), blue (B), red (R), green (G), and blue (B), and the three-color LED having high luminance is effectively obtained. Therefore, three-color light having a large light amount and having enhanced parallelism is obtained via the emission end surfaces of the taper rods 36-1, 36-2. It is to be noted that the order of emitted colors is not limited to the above, and may appropriately be selected.

Moreover, as described above, when the display data correction control section 22 corrects and controls the display data in accordance with the amount of light received by the light receiving device 26, needless to say, the white balance may also be attained.

Figure 42:
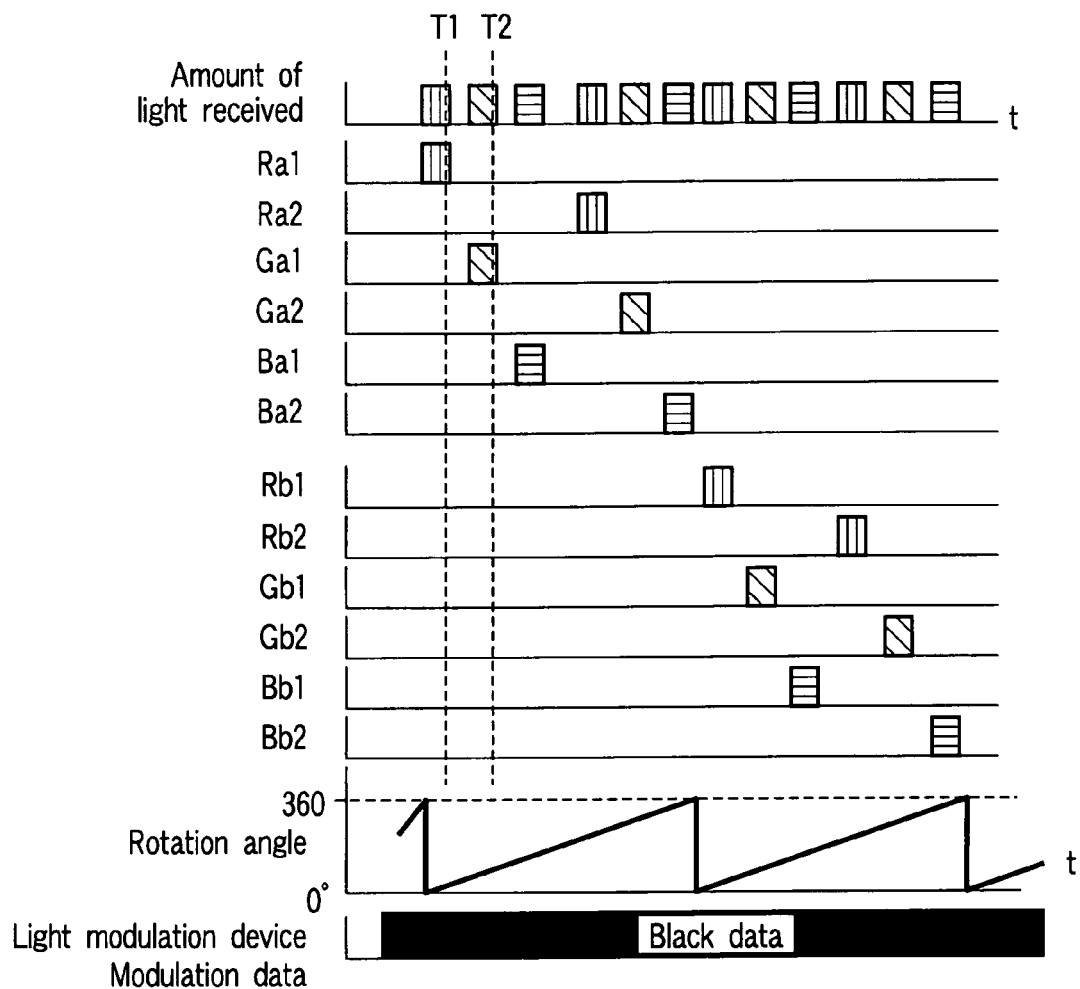
FIG. 42 is a timing chart of the display apparatus according to the sixth embodiment in an adjustment mode.

On the other hand, in an adjustment mode which is not the usual display state, as shown in FIG. 42, one LED 10 capable of emitting the light taken in by one of the taper rods 36 is controlled to be lit with the rotation. Then, as usual, the motor 82 is driven to rotate the rod holder 84, one LED 10 is allowed to emit the light with respect to one taper rod 36 at a predetermined timing synchronized with the rotation, and the light receiving signal from the light receiving device 26 is monitored for two rotations. Moreover, the monitor result is analyzed, and the output of the light receiving signal of the light receiving device 26 can be used in accordance with the timing of the lighting control to identify the amount of light emitted by each LED 10. Moreover, the total light amount by R, G, B in one frame at the display time can be calculated from the result, and the color balance adjustment control section 20 adjusts/control the color balance. It is to be noted that since black data is supplied to the light modulation device 16 in the adjustment mode, a black image is assumed to be displayed on the screen S.

Moreover, as described above, the amount of light emitted by each LED 10 can be calculated. Therefore, the amount of light emitted by each LED can be adjusted and controlled, and the change of an illuminative light amount with time can be suppressed. Moreover, even when one LED does not emit the light because of failure, this can be detected, and a warning indicating the replacement of the light source can be displayed with respect to the user.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A display apparatus capable of illuminating a light modulation device with a light from a light emitting source to display an image on a display plane, the apparatus comprising:

a plurality of light emitting bodies different from one another in emitted light color;

a light receiving device configured to detect the light from the light emitting bodies and to output an amount of light received;

a color balance adjustment control section configured to adjust and control a color balance in the display plane in accordance with the amount of light received by the light receiving device, and capable of identifying the emitted light colors of each of the light emitting bodies relating to the amount of light received;

wherein the color balance adjustment control section comprises an emitted light amount adjustment control section configured to control lighting so as to adjust the amount of light emitted by the light emitting bodies in adjusting and controlling the color balance in the display plane; and the emitted light amount adjustment control section decreases a supply current into the light emitting bodies relating to at least any one of different emitted light colors as compared with that before the adjustment in such a manner that the amount of light emitted of each of the different emitted light colors satisfies an emitted light amount ratio between the emitted light colors required for keeping the color balance in adjusting and controlling the color balance in the display plane.

2. A display apparatus capable of illuminating a light modulation device with a light from a light emitting source to display an image on a display plane, the apparatus comprising:

a plurality of light emitting bodies different from one another in emitted light color;

a light receiving device configured to detect the light from the light emitting bodies and to output an amount of light received;

a color balance adjustment control section configured to adjust and control a color balance in the display plane in accordance with the amount of light received by the light receiving device, and capable of identifying the emitted light colors of each of the light emitting bodies relating to the amount of light received;

wherein the color balance adjustment control section comprises an emitted light amount adjustment control section configured to control lighting so as to adjust the amount of light emitted by the light emitting bodies in adjusting and controlling the color balance in the display plane; and the emitted light amount adjustment control section in adjusting and controlling the color balance in the display plane is configured to be capable of switching to:

a life priority mode in which a supply current into the light emitting bodies relating to at least any one of the different emitted light colors is decreased as compared with that before the adjustment; and a brightness priority mode in which the supply current into the light emitting bodies relating to at least any one of the different emitted light colors is increased as compared with that before the adjustment.

3. A display apparatus capable of illuminating a light modulation device with a light from a light emitting source to display an image on a display plane, the apparatus comprising:

a plurality of light emitting bodies different from one another in emitted light color;

a light receiving device configured to detect the light from the light emitting bodies and to output an amount of light received;

a color balance adjustment control section configured to adjust and control a color balance in the display plane in accordance with the amount of light received by the light receiving device, and capable of identifying the emitted light colors of each of the light emitting bodies relating to the amount of light received;

wherein the color balance adjustment control section comprises an emitted light amount adjustment control section configured to control lighting so as to adjust the amount of light emitted by the light emitting bodies in adjusting and controlling the color balance in the display plane; and the emitted light amount adjustment control section increases a supply current into the light emitting bodies relating to at least any one of different emitted light colors as compared with that before the adjustment in such a manner that the amount of light emitted by each of the different emitted light colors satisfies an emitted light amount ratio between the emitted light colors required for keeping the color balance in adjusting and controlling the color balance in the display plane.

4. A display apparatus capable of illuminating a light modulation device with a light from a light emitting source to display an image on a display plane, the apparatus comprising:

a plurality of light emitting bodies different from one another in emitted light color;

a light receiving device configured to detect the light from the light emitting bodies and to output an amount of light received;

a color balance adjustment control section configured to adjust and control a color balance in the display plane in accordance with the amount of light received by the light receiving device, and capable of identifying the emitted light colors of each of the light emitting bodies relating to the amount of light received; and a mode switch section constituted to be capable of switching a display mode and an adjustment mode, wherein the display mode is a state in which the image is displayed on the display plane in accordance with a video signal, and the adjustment mode is a state in which image data to be inputted into the light modulation device is a calibration image suitable for the color balance adjustment control section to adjust the color balance, when the light receiving device detects the light amount.

5. The apparatus according to claim 4, wherein the mode switch section switches the mode in accordance with a user's operation.

6. A display apparatus capable of illuminating a light modulation device with a light from a light emitting source to display an image on a display plane, the apparatus comprising:

a plurality of light emitting bodies different from one another in emitted light color;

a light receiving device configured to detect the light from the light emitting bodies and to output an amount of light received;

a color balance adjustment control section configured to adjust and control a color balance in the display plane in accordance with the amount of light received by the light receiving device, and capable of identifying the emitted light colors of each of the light emitting bodies relating to the amount of light received;

wherein the color balance adjustment control section is configured:

to detect a state in which predetermined conditions are not satisfied in adjusting the color balance; and to notify a user of said state in a manner recognizable to the user with the detection of the state.

* * * * *